US010120373B2

(12) United States Patent
Berinato et al.

(10) Patent No.: US 10,120,373 B2
(45) Date of Patent: Nov. 6, 2018

(54) AUTOMATED TESTING AND DIAGNOSTICS OF BUILDING AUTOMATION AND CONTROLLED SYSTEMS

(71) Applicant: Enica Engineering, PLLC, New York, NY (US)

(72) Inventors: Reed Berinato, Clifton, NJ (US); Sandin Joseph Feuss, Ramsey, NJ (US)

(73) Assignee: Enica Engineering, PLLC, New York, NY (US)

( * ) Notice: Subject to any disclaimer, the term of this patent is extended or adjusted under 35 U.S.C. 154(b) by 1107 days.

(21) Appl. No.: 14/280,255

(22) Filed: May 16, 2014

(65) Prior Publication Data

US 2014/0343886 A1    Nov. 20, 2014

Related U.S. Application Data

(60) Provisional application No. 61/824,131, filed on May 16, 2013.

(51) Int. Cl.
*G06F 11/263* (2006.01)
*G05B 23/02* (2006.01)

(52) U.S. Cl.
CPC .. *G05B 23/0256* (2013.01); *G05B 2219/2642* (2013.01)

(58) Field of Classification Search
CPC .... G06Q 10/04; G06Q 50/08; G06Q 10/0639; G06Q 10/06; G05B 23/0256;
(Continued)

(56) References Cited

U.S. PATENT DOCUMENTS 6,851,621 B1 * 2/2005 Wacker ............... F24F 11/0086
165/11.1
8,532,808 B2 * 9/2013 Drees ..................... G05B 15/02
700/109
(Continued)

FOREIGN PATENT DOCUMENTS

EP        2354865 A1    8/2011

OTHER PUBLICATIONS

International Searching Authority, International Search Report and Written Opinion for International Application No. PCT/US2014/038466, dated Sep. 12, 2014, 13 pages, European Patent Office, The Netherlands.

*Primary Examiner* — Mohamed Charioui
*Assistant Examiner* — Leonard S Liang
(74) *Attorney, Agent, or Firm* — Alston & Bird LLP

(57) ABSTRACT

Various embodiments provide systems, methods, and computer program products for diagnosing an operational functionality and/or performance of one or more building controlled systems. Such are generally configured to: correlate one or more control system points with one or more test variables associated with one or more test sequences; execute at least one of said one or more test sequences based at least in part upon said correlation and at least in part upon one or more user-defined parameters, the execution generating test data indicative of one or more results; at least in part analyze the test data to identify whether one or more discrepancies exist therein, the identification being based at least in part upon a comparison of the test data with the one or more control system point properties; and generate at least one of one or more reports, one or more alerts, or one or more instructions.

26 Claims, 15 Drawing Sheets

(58) Field of Classification Search
CPC ............ G05B 2219/2642; G05B 23/02; G01R 21/133; G01R 22/00; G01D 4/004; G06F 11/3409; G06F 11/008; G06F 11/2257
USPC ...... 702/119, 123; 700/275, 276, 83; 706/46
See application file for complete search history.

(56) References Cited

U.S. PATENT DOCUMENTS

| | | | |
|---|---|---|---|
| 2006/0058900 A1* | 3/2006 | Johanson | G05B 15/02 700/83 |
| 2007/0069850 A1 | 3/2007 | Anderson, Jr. et al. | |
| 2008/0231437 A1* | 9/2008 | Singhal | F24F 11/0009 340/514 |
| 2008/0243657 A1* | 10/2008 | Voysey | G06Q 30/04 705/34 |
| 2010/0042376 A1* | 2/2010 | Weatherhead | G05B 19/409 703/1 |
| 2011/0088000 A1* | 4/2011 | Mackay | G06T 19/00 715/853 |
| 2011/0191634 A1* | 8/2011 | Park | G05B 15/02 714/32 |
| 2012/0129443 A1* | 5/2012 | Bastow | F24F 13/16 454/258 |
| 2012/0259683 A1 | 10/2012 | Cochran et al. | |
| 2013/0085614 A1* | 4/2013 | Wenzel | F24F 11/006 700/277 |
| 2014/0245071 A1* | 8/2014 | Drees | G05B 15/02 714/39 |
| 2014/0278165 A1* | 9/2014 | Wenzel | G06Q 50/08 702/61 |
| 2014/0282227 A1* | 9/2014 | Nixon | G06F 17/5009 715/786 |

\* cited by examiner

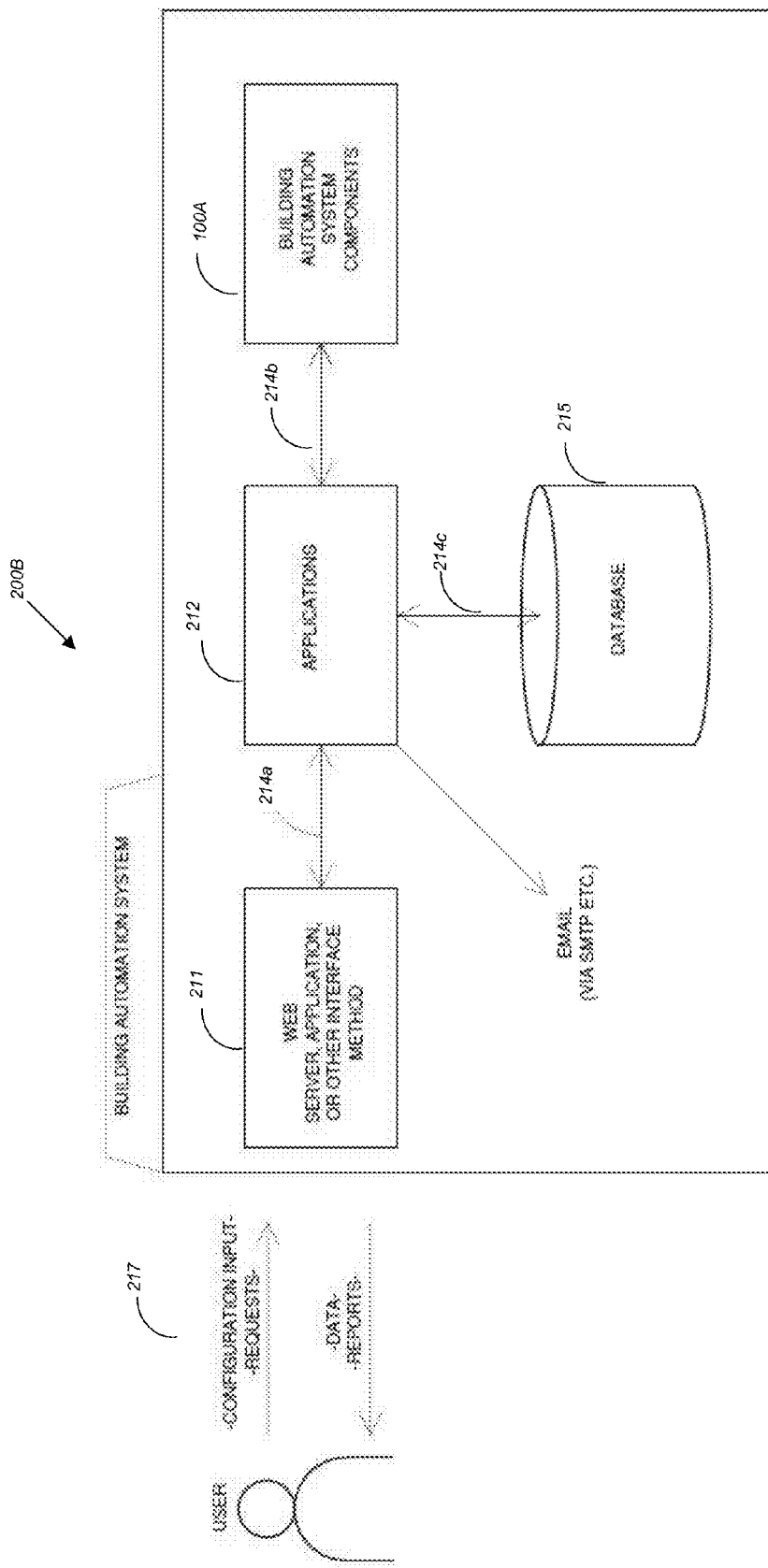

| | | |
|---|---|---|
| 4/2/14 2:15 AM | 213 CFM | Flag-100 |
| 4/2/14 2:20 AM | 199 CFM | Flag-100 |
| 4/2/14 2:25 AM | 225 CFM | Flag-100 |
| 4/2/14 2:30 AM | 200 CFM | Flag-100 |
| 4/2/14 2:35 AM | 201 CFM | Flag-100 |
| 4/2/14 2:40 AM | 217 CFM | Flag-100 |
| 4/2/14 2:45 AM | 202 CFM | Flag-100 |
| 4/2/14 2:50 AM | 179 CFM | Flag-100 |
| 4/2/14 2:55 AM | 13 CFM | Flag-40 |
| 4/2/14 3:00 AM | 27 CFM | Flag-40 |
| 4/2/14 3:05 AM | 206 CFM | Flag-100 |
| 4/2/14 3:10 AM | 211 CFM | Flag-100 |

*Fig. 9B*

AUTOMATED TESTING AND DIAGNOSTICS OF BUILDING AUTOMATION AND CONTROLLED SYSTEMS

CROSS-REFERENCE TO RELATED APPLICATIONS

This application claims priority to and the benefit of U.S. Provisional Patent Application Ser. No. 61/824,131, filed May 16, 2013, the contents of which are hereby incorporated by reference in their entirety.

BACKGROUND

Related Field

Various embodiments of the present invention generally relate to building heating, ventilating, and air conditioning (HVAC) systems, central utility and central plant systems serving one or more buildings as such are commonly known and understood in the art, along with the one or more control systems (e.g., building automation systems (BASs), building management systems (BMSs), or the like) that automate these aforementioned systems. Various embodiments of the invention are particularly used to assess the operational functionality of these systems, define and redefine the system performance and performance limitations, and quantify the envelope of operation in terms of the metrics used to define the system upon initial design and construction.

Description of Related Art

Conventional building automation systems and/or ongoing commissioning systems may be configured to passively monitor the status of one or more devices and/or sensors associated with a particularly monitored building. In such instances, monitored or monitoring devices are typically configured to provide data to the monitoring systems periodically, on the basis of which any of a variety of analysis and/or reports may be generated. This data is typically acquired with intervals in a range of 1-15 minutes between successive data points in the logs, whereby populated data may be compiled and/or reported quite some time (e.g., six hours to even six months, or otherwise) post real-time observation of the characteristics upon which they are based.

The typical six hour to even six month delay periods for data reporting make conventional trend data oftentimes prove much less valuable as a basis for real-time data analysis than would otherwise be possible with more real-time based data analysis. This delay also makes real-time automation of maintenance and enhancement activities associated with monitored building automation systems largely unfeasible. Still further, with conventional trend data, certain events may sometimes be confined to a period between successive trend intervals or log reports or be inherently limited in range based on the automation system operating software (sequence of operations) and thus remain wholly undetected in the log, thereby leaving them unaddressed and/or unmitigated.

Additional disadvantages of conventionally pre-established data points and conventionally pre-programmed operational limits are: minimal flexibility, delayed response times, limited breadth of information, and inefficient handling of a variety of building management tasks. Such limitations of conventional building management systems create challenges to manipulating and adjusting new and/or renovated building components to meet a variety of energy efficiency standards and to operate as efficiently and predictably as practically possible.

Thus, a need exists for building-based control systems to be actively tested. This requirement for active testing is conventionally addressed by a field technician or engineer manually manipulating a building automation system while concurrently collecting data manually, by stand-alone data acquisition, and/or by collecting short-term control point trends in the control system or BAS. These conventional approaches, although often effective, are fundamentally limited in that the commands to the end devices and data collected from the end devices is all handled by the BAS and thus is vulnerable to the reliability of the BASs' operation. If a test is being conducted on a BAS or BAS element and the BAS is not working properly, the test results could be skewed or invalidated and problems could go unnoticed or be reported in a way that indicates a problem of lesser magnitude than actually exists. A need thus also exists for an external platform to perform the tests acting as a watchdog over the BAS rather than the BAS perform these convention "self-diagnostics" whether influenced by an external force or not.

In the past BASs were isolated in that individual pieces of equipment throughout the BAS operated independently such that a single malfunctioning device may or may not go unnoticed. At the present time, and more so in the future, BAS systems are passing more information over their networks that is being used to make decisions within the sequence of operations. For example, an air handling unit may change the magnitude of static pressure it supplies to the ductwork system based on the position of a device within the ductwork system (critical device). The air handling unit controller and the device controller may not be the same device and thus will typically communicate over some type of network making the sequence of operation in the air handling unit controller that is increasingly reliant on multiple devices within the control system or BAS network operating properly and reliably in order to maintain intended and efficient continuous operation. Ensuring these devices operate reliably, predictably, and continuously is not financially viable using conventional manually-intensive methods; a more efficient, effective, and near real-time approach is needed.

BRIEF SUMMARY

Various embodiments of the present invention generally relate to building heating, ventilating, and air conditioning (HVAC) systems, central utility and central plant systems serving one or more buildings, and control systems (e.g., building automation systems (BASs)) that automate these aforementioned systems. Various embodiments of the invention are particularly used to assess the operational functionality of these systems, define and redefine the system performance and performance limitations, and quantify the envelope of operation in terms of the metrics used to define the system upon initial design and construction.

According to various embodiments, an automated testing system for diagnosing an operational functionality and/or performance of one or more building controlled systems is provided. The system comprises: one or more memory storage areas containing one or more user-defined parameters, one or more analysis parameters, and one or more control system point properties, the one or more control system point properties being associated with one or more properties or characteristics of one or more devices connected to the control system for purposes of monitoring thereof; and one or more computer processors. According to various embodiments, the one or more computer processors are configured to: correlate the one or more control system points with one or more test variables, the one or more test variables being associated with one or more test sequences accessible via the system; execute at least one of the one or more test sequences based at least in part upon the correlation and at least in part upon one or more of the user-defined parameters, the execution generating test data indicative of one or more results of the at least one executed test sequence; upon completion of the at least one executed test sequence, at least in part analyze the test data to identify whether one or more discrepancies exist therein, the one or more discrepancies being identified based at least in part upon a comparison of the test data with the one or more control system point properties; and generate at least one of one or more reports, one or more alerts, or one or more instructions based at least in part upon the test data and upon whether one or more discrepancies were identified as existing therein.

In certain embodiments, the one or more computer processors may be further configured to, in response to identifying one or more discrepancies, facilitate an adjustment of one or more of the one or more control system point properties, the adjustment being configured to improve the operational functionality and/or performance of one or more building control systems.

In certain embodiments, the one or more computer processors may be further configured to generate one or more instructions, the one or more instructions being configured to command the adjustment of the one or more control system point properties, so as to improve the operational functionality and/or performance of the one or more building control systems.

According to various embodiments, a computer-implemented method for diagnosing an operational functionality and/or performance of one or more building controlled systems is provided. The method comprises the steps of: receiving and storing within one or more memory storage areas at least one or more user-defined parameters, one or more analysis parameters, and one or more control system point properties, the one or more control system point properties being associated with one or more properties or characteristics of one or more devices connected to the control system for purposes of monitoring thereof; correlating, via at least one computer processor, the one or more control system points with one or more test variables, the one or more test variables being associated with one or more test sequences accessible via the system; executing, via the at least one computer processor, at least one of the one or more test sequences based at least in part upon the correlation and at least in part upon one or more of the user-defined parameters, the execution generating test data indicative of one or more results of the at least one executed test sequence; upon completion of the at least one executed test sequence, at least partially analyzing, via the at least one computer processor, the test data to identify one or more discrepancies therein, the one or more discrepancies being identified based at least in part upon a comparison of the test data with the one or more control system point properties; and generating, via the at least one computer processor, at least one of one or more reports, one or more alerts, or one or more instructions based at least in part upon the test data and upon whether one or more discrepancies were identified as existing therein.

Various embodiments also provide a non-transitory computer program product comprising at least one computer-readable storage medium having computer-readable program code portions embodied therein. The computer-readable program code portions comprise: an executable portion configured for receiving and storing within one or more memory storage areas one or more user-defined parameters, one or more analysis parameters, and one or more control system point properties, the one or more control system point properties being associated with one or more properties or characteristics of one or more devices connected to the control system for purposes of monitoring thereof; an executable portion configured for correlating the one or more control system points with one or more test variables, the one or more test variables being associated with one or more test sequences accessible via the system; an executable portion configured for executing at least one of the one or more test sequences based at least in part upon the correlation and at least in part upon one or more of the user-defined parameters, the execution generating test data indicative of one or more results of the at least one executed test sequence; an executable portion configured for upon completion of the at least one executed test sequence, at least in part analyzing the test data to identify one or more discrepancies therein, the one or more discrepancies being identified based at least in part upon a comparison of the test data with the one or more control system point properties; and an executable portion configured for generating at least one of one or more reports, one or more alerts, or one or more instructions based at least in part upon the test data and upon whether one or more discrepancies were identified as existing therein.

BRIEF DESCRIPTION OF THE SEVERAL VIEWS OF THE DRAWING(S)

Reference will now be made to the accompanying drawings, which are not necessarily drawn to scale, and wherein:

FIG. 1 is an overview of a system architecture 20 that can be used to practice various embodiments of the present invention.

FIG. 2A is an exemplary schematic diagram of an automated testing system 200 containing a plurality of exemplary modules 400-700 as may be utilized in conjunction with the system architecture 20 according to various embodiments of the present invention.

FIGS. 7A-D illustrates exemplary and non-limiting iterative reports of automated testing that may be generated according to various embodiments of the present invention.

Figure 8:
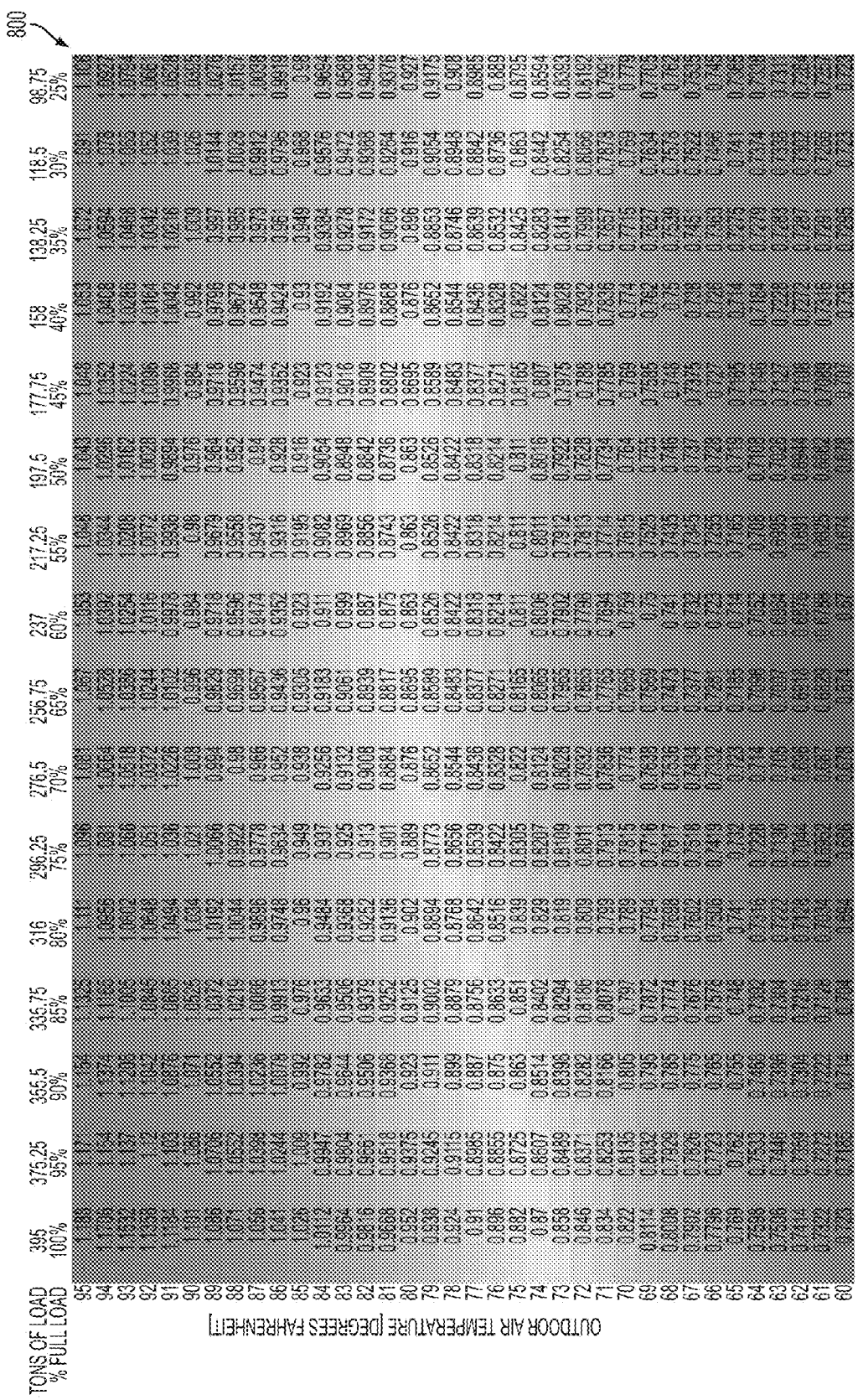

FIG. 8 illustrates a performance mapping of an air cooled chiller, as may be generated according to various embodiments of the present invention.

Figure 9A:
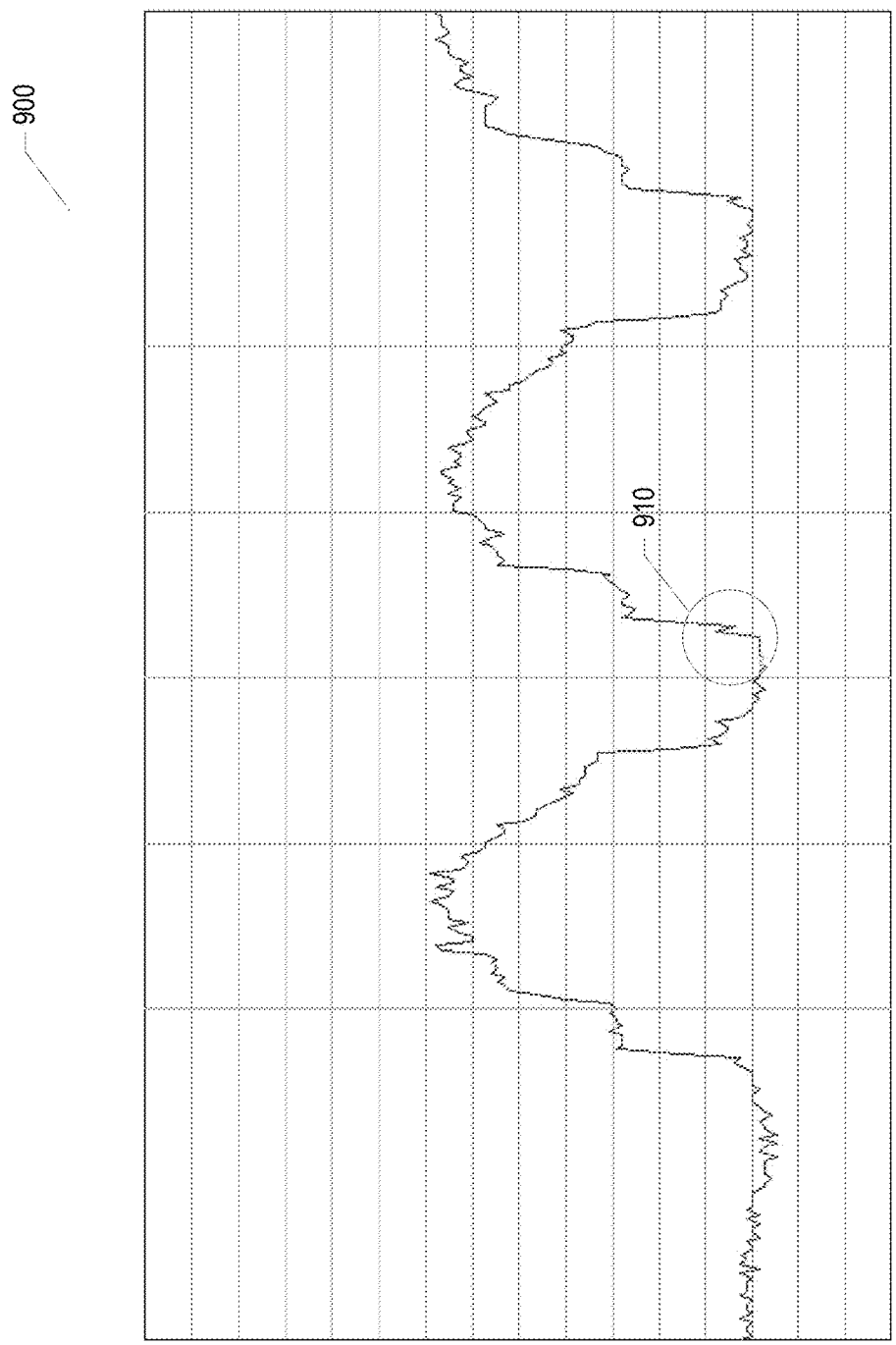

FIG. 9A illustrates an exemplary chart, as may be generated as an exemplary and non-limiting type of report of automated testing, providing users of the system according to various embodiments of the present invention with an indication of data quality.

FIG. 9B illustrates a further exemplary chart, as may be generated to provide users of the system according to various embodiments of the present invention with additional and/or alternative indication(s) of data quality.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Generally speaking, various embodiments of the present invention generally relate to building heating, ventilating, and air conditioning (HVAC) systems, central utility and central plant systems serving one or more buildings, and control systems (e.g., building automation systems (BASs), building management systems (BMSs), or the like) that automate these aforementioned systems. Various embodiments of the invention are particularly used to assess the operational functionality of these systems, define and redefine the system performance and performance limitations, and quantify the envelope of operation in terms of the metrics used to define the system upon initial design and construction.

To achieve these and other non-limiting advantages and benefits, the various embodiments described herein automate and manage the scheduling of one or more processes for: performing functional tests, performing system and performance tests, reporting test results, automating the generation of corrective recommendation reporting, for taking corrective actions and dynamically optimizing equipment and building performance using the results of active testing performed both inside and outside the normal operating programming of the building systems. In other words, various embodiments execute one or more processes, record values and/or data generated thereby, analyze those values and/or data, and create a report or command instructions based on the results of the analysis, at least the command instructions being configured to some degree influence future operation of the system.

More specifically, various embodiments interface with a control system or BAS in a capacity that allows such to command the BAS output points and virtual points at a higher priority than the BAS, read all point values of the control system or BAS at any given (e.g., predetermined or otherwise desirable) time, and release control of the systems back to the BAS so as to return to normal operation upon completion of execution of the one or more processes. Release may, in certain embodiments, be accompanied by one or more adjustments or modifications to the systems so as to improve efficiency and/or one or more other parameters of the system.

According to various embodiments, the one or more processes may be configured to execute functional tests, system tests, and/or performance tests of building HVAC, mechanical, electrical, and/or plumbing (MEP) systems and central utility plant systems. Of course additional and/or alternative systems may also be tested and/or otherwise evaluated in certain embodiments.

For purposes of definition, functional testing is generally testing the function of the non-limiting examples of a device, piece of equipment, component, or minor system such as a fan coil unit, variable air volume terminal device, or chilled water coil chilled water flow control apparatus. Function is tested by feeding an input(s) and examining the output. Due to the limited diversity of HVAC equipment types, functional testing scripts can be pre-packaged for common equipment types leaving a low requirement for customization. In one rudimentary example, a fan may be functionally tested by feeding into the control system or BAS a fan speed command and reading airflow. If airflow increases with speed, the fan functions. This is a simple and non-limiting example, but exemplifies the fundamental basis of all functional testing, command and feedback. Building on this simple example test, airflow at a zero fan speed command could be analyzed seeking a correlation near zero. As speed command increases, airflow feedback could be analytically correlated to fan affinity laws; if the laws are deviated beyond tolerances, a report could be generated indicating a fault in the fan's observed vs. predicted operation, and so on.

For further purposes of definition, system testing is similar to functional testing although the systems tested are comprised of multiple components that can each also be functionally tested. System testing is more complex and diverse than functional testing due to the increase in the amount and type of variables involved. Like functional testing, individual system tests can be pre-packaged for common system types, as described elsewhere herein, but the opportunities for custom application via the various embodiments of the present invention are far greater than with functional testing of fundamental components. In a simple and non-limiting example of system testing, an air handling unit in an HVAC system can be tested to determine if it is capable of producing supply air at temperatures within the operational requirements of its own design. In this case, the various embodiments described herein may be configured to command the supply air temperature (SAT) set-point between the upper and lower bounds of normal operation in predetermined temperature increments such as one degree Fahrenheit. The various embodiments will then command the SAT set-point to the low value, incrementally raising the set-point while recording the SAT input point value through the duration of the test. The analysis conducted may thus comprise determining the deviation of SAT from SAT set-point at the interval immediately prior to the next change in set-point. If, for example, the deviation from set-point is greater than a threshold value, as may be pre-established and/or pre-determined based at least in part upon user or system preferences and/or parameters or the like, the test fails for that set-point value.

Still further for purposes of definition, performance testing uses the same fundamental principles as functional and system testing, namely cause and effect (input and output), but the goal of performance testing is to create an array of data relative to the performance metrics of systems and equipment that are observed independently and likely in a realm beyond that of the normal sequence of operation and/or BAS programming limits. The purpose of this data array is to provide to the user of the various embodiments described herein an indication of the comprehensive capabilities of the system or system components, to define performance limits of the system which may have previously gone unnoticed, and to define the efficiency relationships of systems and equipment relative to interdependent parameters. In a simple and non-limiting example of performance testing, a single pressure independent variable air volume terminal unit (VAV Box) may be tested to determine its airflow minimum and maximum capabilities. In this exemplary and non-limiting test, as will be described in further detail elsewhere herein, the airflow set-point may be incrementally commanded from zero to a value determined to be beyond the VAV Box's maximum capacity. Airflow feedback is recorded throughout the test. The analysis conducted may thus comprise examining the lower end of the airflow feedback for signal stability; once the signal stabilizes within a tolerance, the minimum airflow value of the VAV box can be determined. At the upper end of the data set, maximum airflow is determined to be the value in which an increase in airflow set-point does not result in a significant increase in airflow feedback. The VAV boxes minimum and maximum airflow capacities may be thus determined and compared to what is expected of the VAV boxes performance, which can also be automated according to the various embodiments of the present invention described herein.

As a result of all forms of testing defined and described above, according to various embodiments of the present invention, one or more reports, alerts, and/or commands (e.g., instructions) may be generated and/or transmitted to one or more users and/or inputs of the system. In certain embodiments, such may contain any of testing results, recommendations for an updated value for a control system or BAS point, and/or instructions to facilitate implementation of the updated value (e.g., for automatic update of values via the embodiments based upon instructions that may be computer-implemented, as a non-limiting example). In the simplest form and as a further non-limiting example, the one or more reports may be created as a printable web page which can be emailed as a digital document, hyperlink, etc. to one or more users and/or responsible parties associated with the system. In a more active form and as previously mentioned, a BAS point value may be automatically updated based upon the one or more reports, for example via generation and transmission of one or more commands or instructions for such automatic update. In certain embodiments, updates may require user authorization prior to implementation, in which scenario one or more alerts may also be generated and/or transmitted to one or more users, as may be desirable.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

Figure 1:
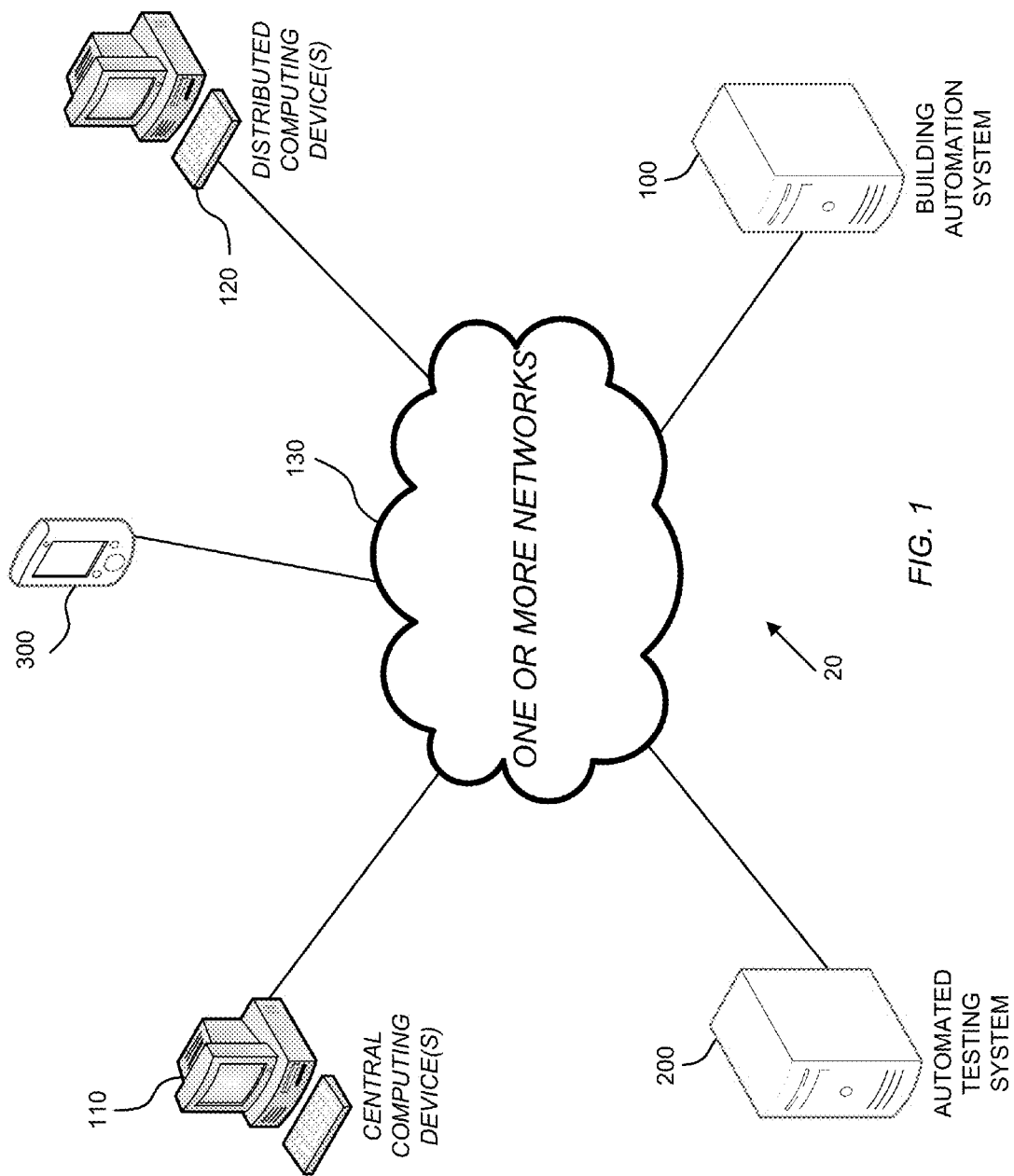

FIG. 1 is a block diagram of an exemplary system and/or system architecture 20 that can be used in conjunction with various embodiments of the present invention. In at least the illustrated embodiment, the system 20 may include one or more central computing devices 110, one or more distributed computing devices 120, and one or more distributed handheld or mobile devices 300, all configured in communication with an automated testing system 200 and/or a building automation system (BAS) 100 (also referred to generally herein as a control system in certain instances) via one or more networks 130. While FIG. 1 illustrates these various entities as separate, standalone entities, the various embodiments are not limited to this particular architecture. As a non-limiting example, as will be described in further detail elsewhere herein, the entity referred to generally herein as the automated testing system 200 may be incorporated within the BAS.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like. In certain embodiments, communication over the one or more networks 130 may be via EtherNet/Industrial Protocol (EtherNet/IP), an application layer protocol similar to Simple Network Management Protocol (SNMP), but treating devices on the network as a series of "objects." In these and still other embodiments, the industrial application layer protocol provided by EtherNet/IP may be used for communication between any of a variety of industrial control systems and their components, as may be part of the system 5 and/or BAS described herein.

Although the device(s) 110-300 are illustrated in FIG. 1 as communicating with one another over the same network 130, these devices may likewise communicate over multiple, separate networks. For example, in certain embodiments, the BAS or control system 100 may be configured to communicate over an RS-485 network, which may be one of the one or more networks 130 illustrated generally in FIG. 1. As commonly known and understood, RS-485 networks may be configured to use a proprietary protocol, an open protocol such as BACNet, or both. Where present, such sub-controller RS-485 network may be configured to terminate at network controllers or routers that expose the RS-485 points to an Ethernet side of the network 130 and the Automated Testing System 200 may interface directly with the RS-485 network and be capable of communicating and controlling points within the RS-485 network and/or the Ethernet network directly or using the routing capabilities of the network controllers. In this manner, it should be generally understood that the network controllers themselves may be configured to communicate with other network controllers, server workstations (e.g., devices 110, 120, 300, and the like) that manage the system and collect data, and any other device that is configured to communicate via the one or more networks 130, including the automated testing system 200 and/or the BAS 100 and the automated testing system can interface with the entire BAS network at any location within and of the BAS's various network types.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130.

Exemplary Automated Testing System 200

Figure 2A:
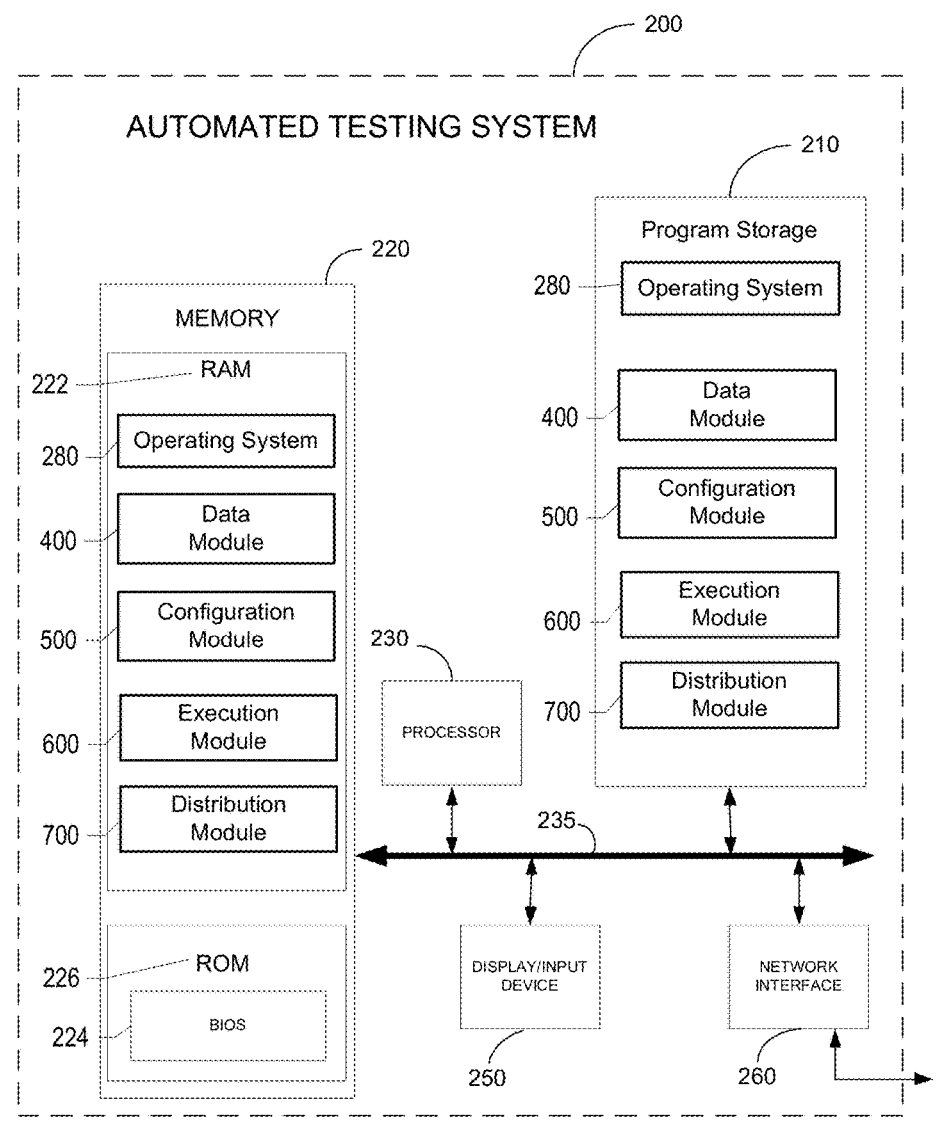
FIG. 2B is an exemplary schematic diagram of an automated testing system 200A illustrating various servers and applications associated therewith, as may be manipulated and/or executed via the exemplary modules of FIG. 2A according to various embodiments of the present invention.
FIG. 2C is an exemplary schematic diagram of an automated testing system 200B configured in a consolidated fashion with a building automation system (BAS) 100A according to various embodiments of the present invention.
FIG. 2D is an exemplary schematic diagram of a handheld or mobile device(s) 300 as may be used in conjunction with the system 200 according to various embodiments of the present invention.

In various embodiments, the automated testing system 200 includes various components for performing one or more functions in accordance with various embodiments of the present invention, including those more particularly shown and described herein. It should be understood, however, that the system 200 might include a variety of alternative devices for performing one or more like functions, without departing from the spirit and scope of the present invention. For example, at least a portion of the system 200, in certain embodiments, may be located and/or otherwise remotely stored on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 (see FIG. 2D) which may be configured so as to provide a user interface for communication with the system 200, all as will be likewise described in further detail below. Still further, in certain embodiments, the automated testing system 200 may incorporate the BAS 100; although in other embodiments as illustrated in at least FIG. 1 and FIG. 2B, the two are separate and distinct components.

Returning now to FIG. 2A, such is a schematic diagram of the automated testing system 200 according to various embodiments. The automated testing system 200 includes a processor 230 that communicates with other elements within the system via a system interface or bus 235. Also included in the automated testing system 200 is a display/input device 250 for receiving and displaying data. This display/input device 250 may be, for example, a keyboard or pointing device that is used in combination with a monitor. The automated testing system 200 further includes memory 220, which preferably includes both read only memory (ROM) 226 and random access memory (RAM) 222. The system's ROM 226 is used to store a basic input/output system 224 (BIOS), containing the basic routines that help to transfer information between elements within the system 200. Various ROM and RAM configurations have been previously described herein.

In addition, the automated testing system 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the automated testing system 200 may further provide the functions of a data storage device, which may store historical and/or current delivery data and delivery conditions that may be accessed by the system 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 400-700) comprising, for example, one or more computer-readable program code portions executable by the processor 230, may be stored by the various storage devices 210 and within RAM 222. Such program modules may also include an operating system 280. In these and other embodiments, the various modules 400, 500, 600, 700 control certain aspects of the operation of the automated testing system 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the automated testing system 200 and are configured to generate data and/or test results, reports, instructions, notifications/alerts, and/or one or more graphical user interfaces for the display thereof, all accessible and/or transmittable to various users of the system 20. In certain embodiments, the user interfaces, reports, instructions, and/or notifications/alerts may be remotely accessible (e.g., in a distributed fashion) via one or more networks 130, which may include the Internet or other feasible communications network, as previously discussed and described herein to include a variety of protocols, such as the non-limiting example of EtherNet/IP. In at least one embodiment, data may be transmitted via the one or more networks 130 to remotely located users in possession of one or more mobile devices 300.

In various embodiments, it should also be understood that one or more of the modules 400, 500, 600, 700 and/or the applications associated therewith may be alternatively and/or additionally (e.g., in duplicate) stored locally on one or more of the devices 110, 120, and/or 300, such that the modules and/or the applications (e.g., software, algorithms, and the like) may be executed by one or more processors of the same. According to various embodiments, the modules 400, 500, 600, 700 may also generate, send data to, receive data from, and utilize data contained in one or more databases, which may be comprised of one or more separate, linked and/or networked databases.

Also located within the automated testing system 200 is a network interface 260 for interfacing and communicating with other elements of the one or more networks 130. It will be appreciated by one of ordinary skill in the art that one or more of the automated testing system 200 components may be located geographically remotely from other system components. Furthermore, one or more of the automated testing system 200 components may be combined, and/or additional components performing functions described herein may also be included in the server. As a non-limiting example, in at least one embodiment the BAS or control system 100 may be incorporated or otherwise combined with the automated testing system 200 so as to provide a consolidated product.

While the foregoing describes a single processor 230, as one of ordinary skill in the art will recognize, the automated testing system 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the automated testing "system" 200, as one of ordinary skill in the art will recognize, embodiments of the present invention are not limited to traditionally defined system architectures. Still further, the system of embodiments of the present invention is not limited to a single system, or similar network entity or mainframe computer system comprising therein one or more servers. Other similar architectures including one or more distributed or even "cloud-based" network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the automated testing system 200 may likewise be used without departing from the spirit and scope of embodiments of the present invention.

According to various embodiments, many individual steps of a process may or may not be carried out utilizing the computer systems and the like described herein, and the degree of computer implementation may vary, as may be desirable and/or beneficial for one or more particular applications.

Distributed Handheld (or Mobile) Device(s) 300

Figure 2B:
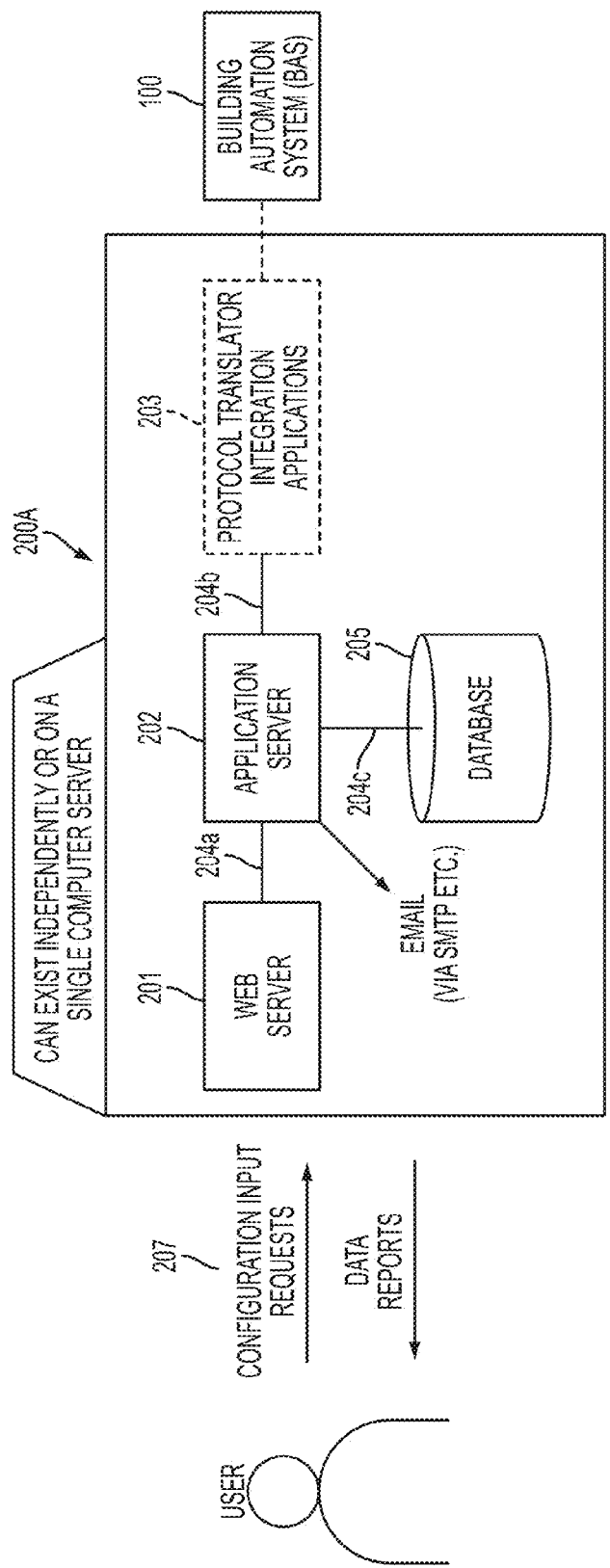
Figure 2D:
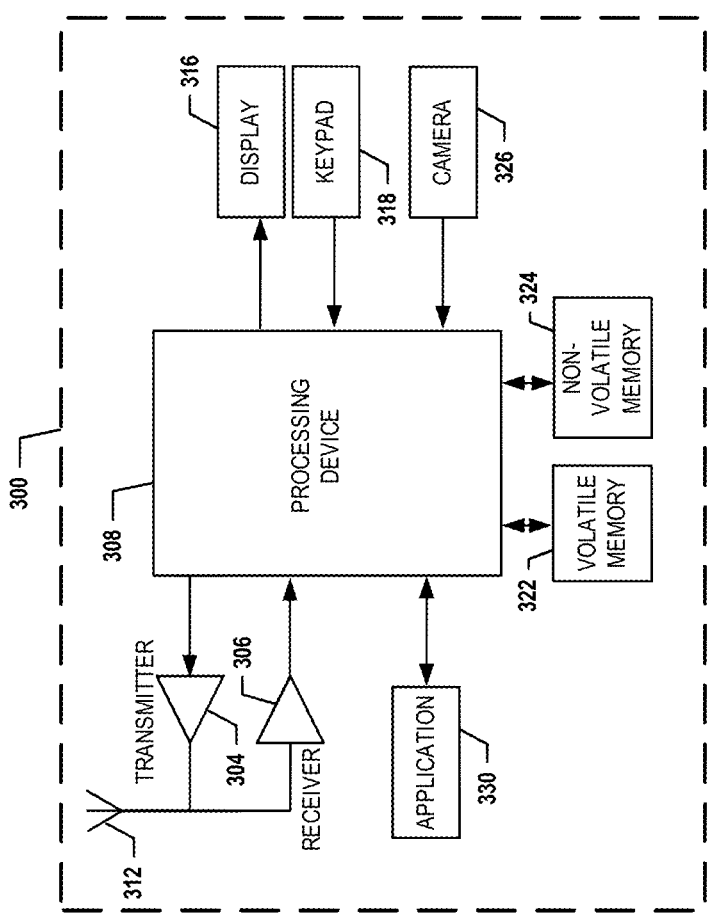

FIG. 2B provides an illustrative schematic representative of a mobile device 300 that can be used in conjunction with various embodiments of the present invention. Mobile devices 300 can be operated by various parties. As shown in FIG. 2B, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the automated testing system 200, the distributed devices 110, 120, the BAS system 100, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol, now known or as may be developed in the future. In any of these and still other embodiments, the mobile device 300 may be further and/or alternatively configured to communicate at least in part via an EtherNet/IP protocol, as such has been previously described herein.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 20 as a whole.

Additional System Architectures

In addition to the above, reference will now be made to FIGS. 2B-2C, which illustrate certain additional exemplary and non-limiting system and/or system architecture embodiments other than that illustrated and previously described herein with respect to FIG. 2A.

FIG. 2B is an illustration of an exemplary system architecture comprising, as in FIG. 2A, an automated testing system 200 (illustrated as 200A but understood to be comparable to system 200 as previously described) and an associated Building Automation System (BAS) (or control system, more generally) 100. The components that comprise the system 200A in at least the illustrated embodiment include a web server 201 that serves as the host of the human-machine-interface, as may be provided and accessible either directly through a host computer entity or via a network 207 analogous to the one or more networks 130 described previously herein with respect to FIG. 1. The system 200A according to various embodiments also comprises an application server 202, protocol translator integration applications 203, and one or more databases 205. It should be understood that these components 202, 203, 205 can exist on a single computer or server, exist independently communicating over a network (whether via Ethernet/IP 204a, 204b, 204c or otherwise), or any combination of the two.

The application server 202 according to various embodiments, with continued reference to FIG. 2B hosts the one or more testing applications as may be executed by the automated testing system 200A. In certain embodiments, such applications may be executed via one or more of the modules 500-700, as illustrated and described at least with respect to FIG. 2A. In these and still other embodiments, the application server 202 contains and/or manipulates all the predefined functional and performance test scripts, database interface management software, reporting tool programs, analysis algorithms, email settings, configuration utilities, and the like, as may be associated with the system 200A and/or the system architecture 20 according to various embodiments.

The database 205 is used to store BAS point information, test results, analytical results, reports, configuration data, and the like. Data stored in the database 205 is typically stored permanently. The database 205 is not a custom element and may take the form of a common commercially available database platform such as Microsoft SQL or equivalent. In certain embodiments, the database 205 as previously noted herein may comprise two or more databases as may be managed by at least the data module 400, also as described previously and elsewhere herein. It should be understood that the database 205 of FIG. 2B is analogous to those databases and may contain any and all types and categories of data therein as those databases and types of data described elsewhere herein with respect to the data module 400 (see, for example, FIG. 3).

The protocol translator integration applications 203 according to various embodiments provide a gateway between the system 200 and the BAS 100, where the latter two components are separate and distinct, as illustrated in FIG. 1. In those embodiments wherein the BAS may be incorporated within the system, protocol translator integration applications 203 may or may not be necessary, as may be understood given that a "translation" between the machine language of the two systems may be rendered moot where such systems are consolidated.

According to various embodiments, the protocol translator integration applications 103 can take multiple forms depending on the characteristics of the BAS 100 the system 200 is interfacing with. Generally speaking, three types of integrations can be used, although such should be considered non-limiting and exemplary for purposes of the present disclosure.

The first type of integration, BACNet integration, is the simplest type. BACNet integration involves a commercially available BACNet stack that correlates to an element within the automated testing system 200 to BACNet points within the BAS 100 to execute commands to and read values from the BAS. BACNet/IP is the most common interface protocol the system 200 will typically use under such integration configurations, although the system is also capable of communicating using BACNet MS/TP, MODBUS, LonWorks, and all other open and proprietary protocols, now known and used and/or as may be developed in the future. When in certain embodiments communicating over an Ethernet connection, the system 200 also has the capability of directly or indirectly physically connecting to an RS-485 network to communicate. In certain embodiments, peer to peer communication is also available over RS-232 or similar connection in certain embodiments.

The second type of integration is with a proprietary automation controller capable of communicating with the BAS 100 native, proprietary protocol as well as the system 200A via BACNet or other open protocol. The proprietary automation controller, although a tool used by the system 200, is in these embodiments fully integrated into the BAS 100.

The third type of integration takes a similar approach to the second, but uses a third party integration platform to provide the communication protocol translation between the BAS 100 and the system 200A. According to various embodiments, the integration can take the form of a software application residing on the same or and external computer/server or the integration can be in the form of a third party hardware device that contains the license and drivers necessary to communicate with the proprietary BAS 100 as well as the system 200A via open and/or licensed protocol.

However integrated or otherwise associated with the system 200A and/or the system architecture 20 (see FIG. 1), the BAS 106 as illustrated in FIG. 2B comprises direct digital controllers (DDCs) at an equipment level (i.e., sub-controllers) typically controlling an individual piece of equipment such as a VAV box, an air handling unit, or a fan coil unit. These sub-controllers typically communicate to other controllers over an RS-485 network using a proprietary protocol, an open protocol such as BACNet, or both. Of course, in certain embodiments, communication may be via, over, or through any of a variety of types or configurations of one or more networks 130, as has been previously described herein. Where an RS-485 network is involved, the sub-controllers may connect to input sensors and output devices using a voltage or milliamp signal. Sub-controller RS-485 networks terminate at network controllers or routers that expose the RS-485 points to the Ethernet, or IP side of the control network and may or may not have their own input sensors and output devices. In this manner, according to various embodiments, network controllers are configured to communicate with other network controllers, server workstations that manage the system and collect date, and any other device that can communicate on the network, including the system.

FIG. 2C is an illustration of an exemplary system architecture wherein the system 200 (illustrated as 200B) and the BAS 100 are integrated as a single consolidated product, whereby the applications 212 of the system 200B and the components 100A of the BAS 100 are provided in a consolidated configuration. The components that comprise the system 200B in at least the illustrated embodiment include a web server 211 that serves as the host of the human-machine-interface, as may be provided and accessible either directly through a host computer entity or via a network 217 analogous to the one or more networks 130 described previously herein with respect to FIG. 1. The system 200B according to various embodiments also comprises an application server 212, protocol translator integration applications 213, and one or more databases 215. It should be understood that these components 212, 213, 215 can exist on a single computer or server, exist independently communicating over a network (whether via Ethernet/IP 214a, 214b, 214c or otherwise), or any combination of the two. It should also be understood that these components 212, 213, 215 and also 211 and 217 are according to various embodiments substantially the same as components 202, 203, 205 and also 201 and 207, as described previously herein with respect to FIG. 2B.

The application server 212 according to various embodiments, with continued reference to FIG. 2C hosts the one or more testing applications as may be executed by the automated testing system 200B. In certain embodiments, such applications may be executed via one or more of the modules 500-700, as illustrated and described at least with respect to FIG. 2A. In these and still other embodiments, the application server 212 contains and/or manipulates all the predefined functional and performance test scripts, database interface management software, reporting tool programs, analysis algorithms, email settings, configuration utilities, and the like, as may be associated with the system 200B and/or the system architecture 20 according to various embodiments.

The database 215 is used to store BAS point information, test results, analytical results, reports, configuration data, and the like. Data stored in the database 215 is typically stored permanently. The database 215 is not a custom element and may take the form of a common commercially available database platform such as Microsoft SQL or equivalent. In certain embodiments, the database 215 as previously noted herein may comprise two or more databases as may be managed by at least the data module 400, also as described previously and elsewhere herein. It should be understood that the database 215 of FIG. 2C is analogous to those databases and may contain any and all types and categories of data therein as those databases and types of data described elsewhere herein with respect to the data module 400 (see, for example, FIGS. 2B and 3).

Notably, the protocol translator integration applications 203 according to various embodiments as illustrated in FIG. 2B is not necessary and thus dispensed with in those configurations such as that illustrated in FIG. 2C, at least in part due to the integration and consolidation of the BAS and the system components described herein.

Exemplary System Operation

Reference is now made to FIGS. 3-6C, which illustrate various flowcharts indicative of execution of one or more modules, applications, or the like associated with or integrated within the automated testing system 200 according to various embodiments.

Figure 3:
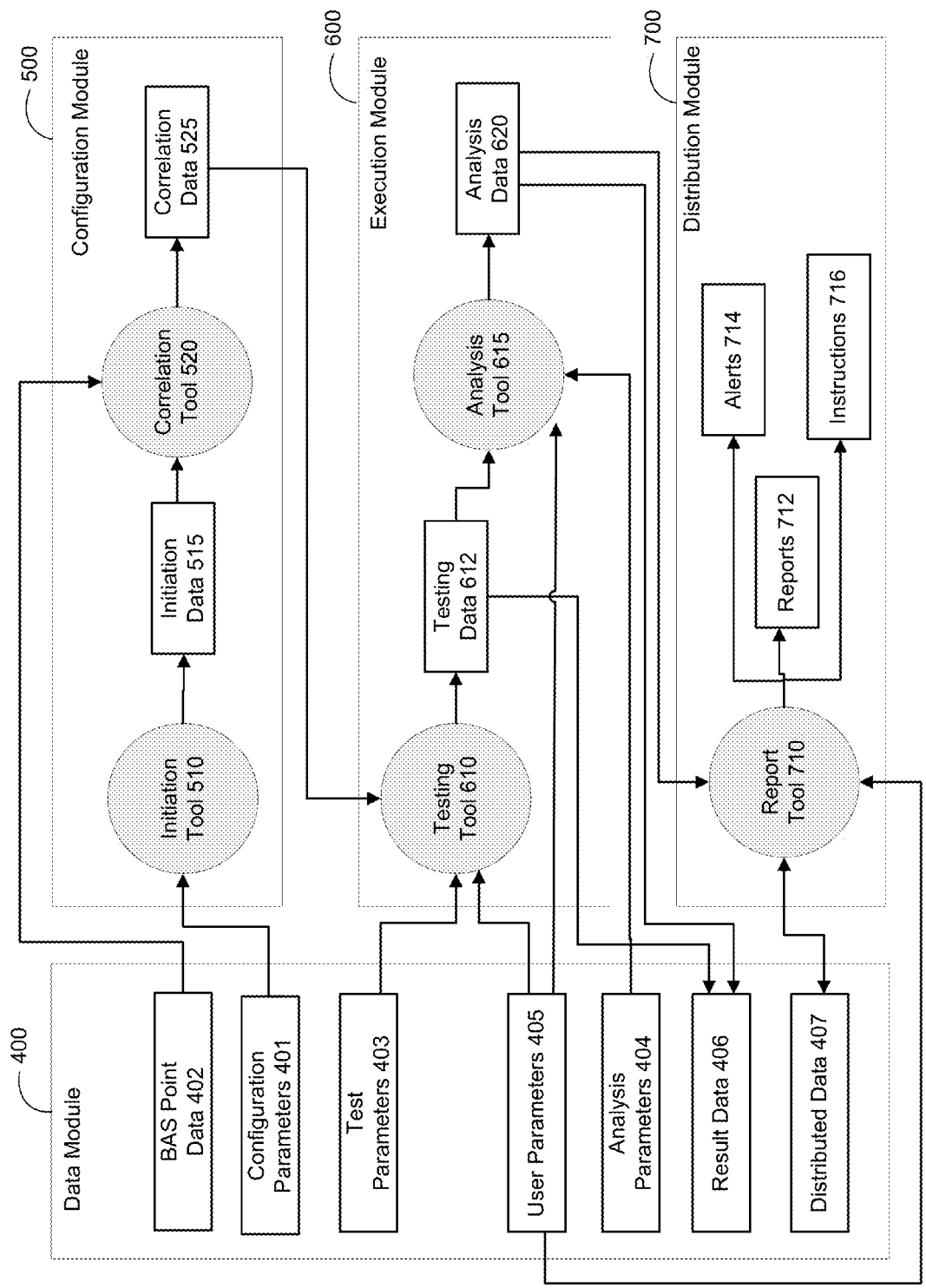
FIG. 3 is an exemplary and high-level flowchart illustrating a cross-functionality of and across various components of the modules 400-700 of FIG. 2A according to various embodiments of the present invention.

Turning first to FIG. 3, with reference also to FIG. 2A, according to various embodiments, the automated testing system 200 may comprise one or more exemplary modules 400-700, which may be configured to execute certain actions or certain applications or the like, so as to perform the one or more testing procedures (see also FIGS. 4-6C) implemented via the system 200 and/or the system architecture 20 described elsewhere herein.

According to various embodiments, the data module 400 is configured to receive, store, retrieve, and/or otherwise manage and maintain a plurality of data, as may be used, generated, and/or transmitted by the automated testing system 200. Such data may comprise, as non-limiting examples, configuration parameters 401, BAS point data 402, test parameters 403, analysis parameters 404, user parameters 405, result data 406, and/or distributed data 407. Such data may further be transmitted by the data module 400, upon request therefor, automatically, or otherwise, to at least one or more of the modules 500-700 for further processing and/or manipulation thereof during the testing and/or reporting procedures, as will be described elsewhere herein.

Figure 5:
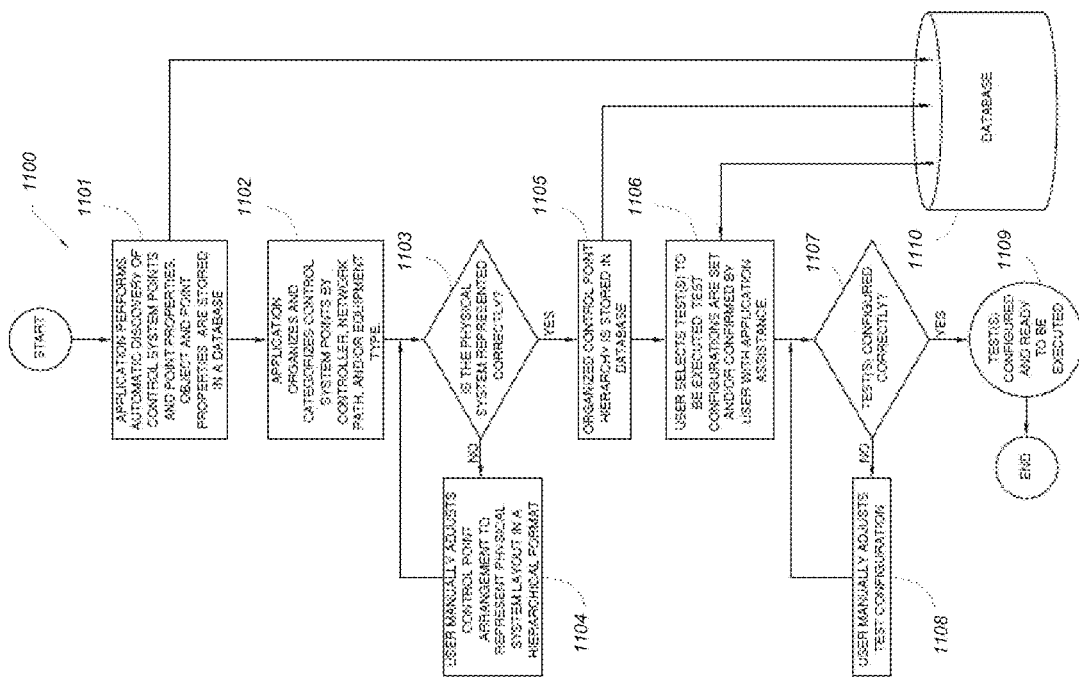
FIG. 5 is an exemplary flowchart 1100 illustrating an exemplary interface and configuration of the system 200 and the BAS 100 according to various embodiments of the present invention.
Figure 6A:
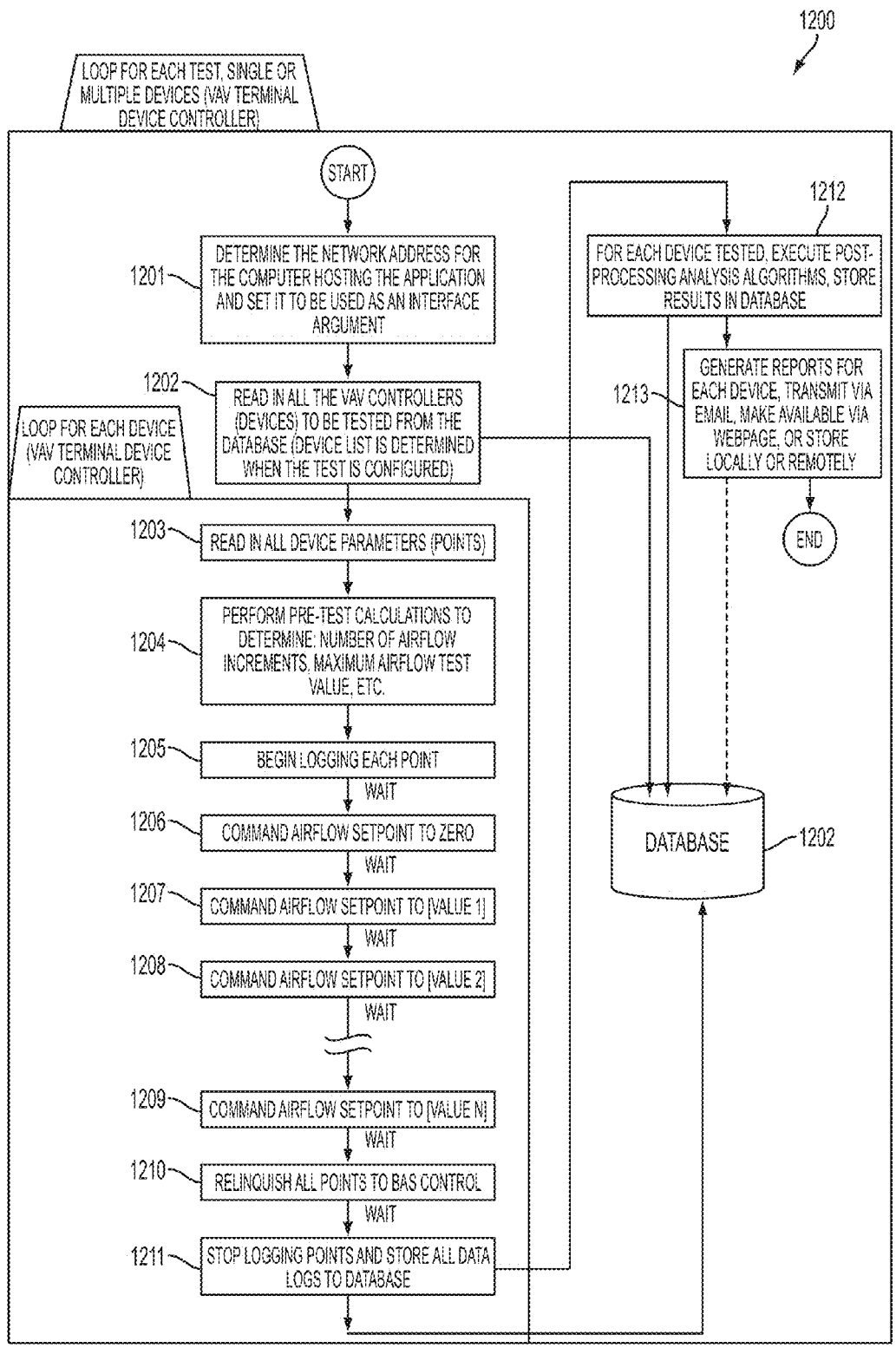
FIG. 6A is an exemplary activity diagram 1200 illustrating an exemplary and generic Variable-Air-Volume (VAV) Functional and Performance Test (VAV Test) as may be executed by the system 200 according to various embodiments of the present invention.

It should be understood that the various data contained and/or otherwise maintained (whether permanently, until overwritten, for a pre-established period of time, or otherwise) by the data module 400 is stored within one more databases (e.g., database 205 of FIG. 2B, database 1110 of FIG. 5, database 1214 of FIG. 6A or the like). These databases 205, 1110, 1214 for the purposes of disclosure herein should be understood to represent separate and distinct storage elements for the data maintained or otherwise generated by the system 200. Of course, it should be understood, as mentioned previously herein that only a single consolidated database may be utilized, as such is commonly known and understood to be configured. Alternatively, a plurality of databases may be utilized for storage of data via the data module 400, as may be interfaced for cross-communication and cross-reference there-through, also as commonly known and understood in the art to involve. Indeed, any of a variety of data storage configurations may be envisioned without departing from the scope and content of the present invention.

Returning now to FIG. 3, the configuration parameters 401 may according to various embodiments comprise one or more parameters associated with how communication is established as between the respective components of the system 200 and/or the system architecture 20, including the BAS 100. The configuration parameters 401 further comprises according to various embodiments values for building components and/or variables associated therewith, as may be based upon desired operating conditions or the like.

The BAS point data 402 comprises according to various embodiments data associated with control system or BAS 100 points that may be subjected to automated testing via the system 200 described herein. Such points correspond in certain embodiments to physical pieces of equipment; in other embodiments, they correspond to sensors or sub-controller interconnects associated therewith, such that one or more characteristics of the equipment may be obtained, stored, and/or monitored. The BAS point data 402 according to various embodiments may further comprise a system mapping of all points (e.g., pieces of equipment or the like) within the scope of the BAS 100.

The test parameters 403 comprise according to various embodiments one or more parameters under which functional system and/or performance tests are conducted against control system or BAS points correlated with the system 200 described herein. The test parameters 403 may comprise one or more algorithms, a series of thresholds, a procedural process via which iterative tests are performed, or the like. It should be understood, however, that regardless the precise content, the test parameters 403 are configured according to various embodiments to control the execution of the desired test(s) by the system 200. In certain embodiments, the test parameters 403 may be pre-established and/or pre-determined, whether by an individual user of the system or otherwise (as pre-set by a provider of the system 200); in other embodiments, the test parameters may be adjusted and/or updated, as desirable, whether by a user of the system or otherwise, for example, to comply with changing regulatory requirements for building efficiency standards or the like. In certain embodiments, the test parameters 403 may comprise simple testing procedure configuration data without further analysis of the data obtained via the testing itself; in other embodiments, the test parameters 403 may also include some degree of post-test analysis.

The analysis parameters 404 comprise according to various embodiments various post-test analyses that may be performed upon the obtained testing data. In certain embodiments, the analysis parameters 404 comprise one or more algorithms configured to determine whether the testing data is acceptable; in other embodiments, the parameters assess whether the testing data falls within a desirable range wherein improvement is not necessary. A variety of configurations and analyses options may be envisioned, as are commonly known and understood in the art for purposes of assessing the nature of data obtained via testing processes, whether automated or otherwise. In certain embodiments, the analysis parameters 404 may be pre-established; in other embodiments, such may be adjusted over time, as may be desirable.

The user parameters 405 comprise according to various embodiments any of a variety of user preferences that may be pre-established, as desirable. For example, a user may wish to receive an alert should a data parameter be out of a pre-determined tolerance; in which case the system 200 may be configured to generate and transmit such an alert, as appropriate. In other embodiments, a user may wish to receive a particularly formatted report of test result data and the analysis thereof; in such instance the user may established a user parameter to have such report emailed to them upon generation thereof. In another embodiment, generation of the report may further trigger an alert to certain users, advising them of the availability of the report, for access thereto at a later time or date. According to various embodiments, the user parameters 405 may be established within the confines of one or more user profiles within the system 200 or the system architecture 20, such that pre-established and/or pre-determined user preferences may be captured and retained for use over time as automated testing commences and continues.

The result data 406 comprises according to various embodiments any data generated via the system 200 during the testing and analysis procedures. Such data may be textual and/or graphical in form, or otherwise. The data 406 may further be stored permanently in the data module 400 and/or one or more databases associated therewith in certain embodiments; in other embodiments, the result data may be stored permanently, so as to create a time log of test results between an integrated system 200 and BAS or control system 100 over a period of time, however as may be desirable.

The distributed data 407 comprises according to various embodiments a record of any reports, alerts, and/or instructions generated via the distribution module 700 according to various embodiments. In other words, the distributed data 407 comprises that data which is created by the system 200 based upon the testing and analysis performed for purposes of distribution thereof to one or more users of the system (and/or to one or more third parties associated therewith—for example a building landlord or the like). The distributed data 407, like any portion of the data 401-406 described previously herein may be stored permanently in one or more databases associated with the data module 400 in certain embodiments; in other embodiments, storage of the data 407 may be only for a predetermined period of time (e.g., 5 years). Various alternative data storage procedures and mechanisms can, of course, be envisioned, without departing from the scope and content of the present invention.

Remaining with FIG. 3, the configuration module 500 is generally arranged according to various embodiments to execute one or more tools (e.g., an initiation tool 510 and/or a correlation tool 520) that are configured to establish communication between the automation system 200, the BAS 100, and/or other components (e.g., distributed devices of FIG. 1), to read in all of the BAS 100 or control system points, to correlate control system or BAS system points to automated test variables, and to configure tests based at least in part thereon in preparation for execution thereof. In certain embodiments, it should be understood that execution of one or more of the initiation tool 510 and/or the correlation tool 520 may occur only once, at the initial pairing of the system 200 and the BAS 100 described elsewhere herein; subsequently, testing may be iteratively performed without further initiation and/or correlation procedures. In other embodiments, it should also be understood that execution of the tools may occur at any time the BAS 100 is expanded, updated, or otherwise altered from an initial or present state. In still other embodiments, it should also be understood that execution of the tools may occur at any time, however, as may be desirable for particular circumstances.

Execution of the initiation tool 510 according to various embodiments results in generation of initiation data 515, which may comprise an indication of whether communication was successfully established or not. Execution of the initiation tool 510 may be in certain embodiments based at least in part upon configuration parameters 401, as may be received from the data module 400, which may collect or otherwise capture such via user inputs or otherwise (see devices for data input of at least FIG. 1).

Execution of the correlation tool 520, which may be based at least in part upon receipt of initiation data 515 results in generation of correlation data 525, which may comprise an indication of the correlations mapped between the system 200 and the BAS 100 points, along with an indication of a test configuration based thereon. Execution of the initiation tool 520 may be in certain embodiments based at least in part upon BAS 100 point data 402, as may be received from the data module 400, whether upon request therefor or automatically. In any case, upon generation of correlation data 525 via execution of the correlation tool 520, such may be forwarded according to various embodiments to the execution module 600.

Figure 4:
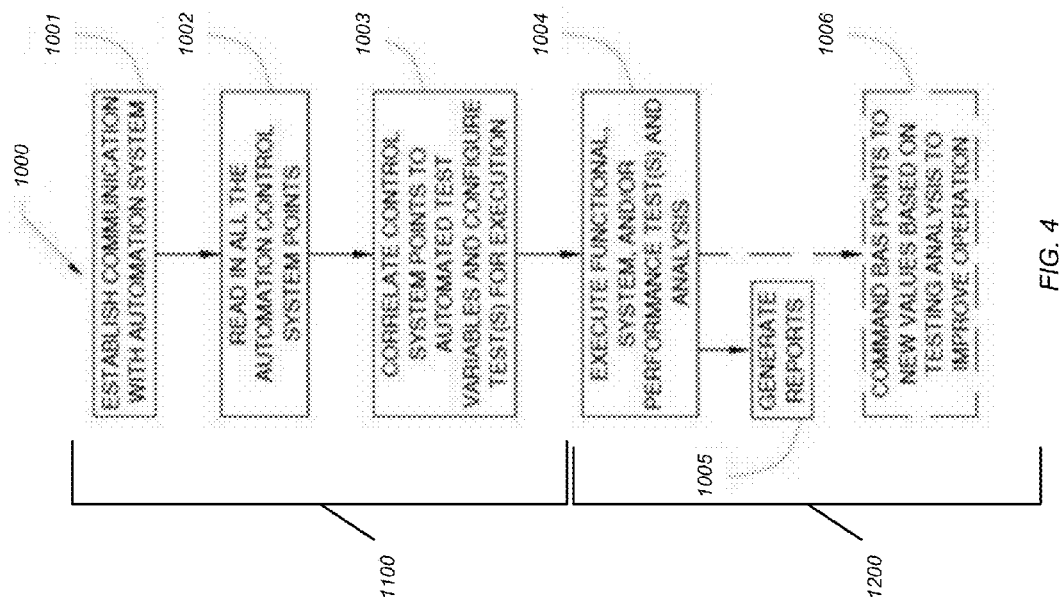
FIG. 4 is an exemplary high-level flowchart 1000 illustrating an exemplary process executed by the system 200 according to various embodiments of the present invention, whether via the applications and servers of FIG. 2B or the modules of FIG. 2A.

Further details with regard to execution of the configuration module 500 will be provided elsewhere herein, but it should be understood that execution of the initiation tool 510 corresponds substantially with execution of steps 1001 and 1002 of FIG. 4 and steps 1101-1105 of FIG. 5. In an analogous fashion, execution of the correlation tool 520 corresponds substantially to execution of step 1003 of FIG. 4 and steps 1106-1109 of FIG. 5, all as will be described in further detail elsewhere herein.

Remaining still further with FIG. 3, the execution module 600 is generally configured according to various embodiments to execute one or more tools (e.g., a testing tool 610 and an analysis tool 615) that are configured to perform one or more procedures for not only the automated tests conducted by the system 200 described herein, but also to analyze the test results (e.g., the testing data 612) generated and/or otherwise captured or obtained thereby. In certain embodiments, the testing conducted may be functional testing only (as defined elsewhere herein), while in other embodiments the testing conducted may be performance testing, as typically done across multiple components and involving iterative functional tests performed thereon (again as defined elsewhere and previously herein). Regardless of the precise nature of the test performed, it should be understood that the execution module 600 is configured according to various embodiments to execute one or more tool so as to at least one of run algorithms, activate software programs, initiate testing applications, or the like.

Execution of the testing tool 610 according to various embodiments comprises at least some implementation of a testing procedure, as has been configured via the configuration module 500 and/or at least selected or otherwise authorized by one or more users of the system, whether at a prior point in time such that the testing occurs in an automated fashion from a real-time perspective or otherwise. In this regard, it should be understood that execution of the testing tool 610 is based at least in part upon receipt or (or retrieval of) at least a portion of test parameters 403 and user parameters 405 as have been previously described herein. Execution of the testing tool 610 according to various embodiments typically generates testing data 612, which is based upon execution of the testing procedures, as based at least in part upon the parameters 403, 405 and/or additionally retrieved algorithms and/or software applications.

Upon generation of testing data 612, according to various embodiments, the execution module 600 is configured to execute an analysis tool 615, which performs some degree of analytical procedures upon the generated test data 612. Execution of the analysis tool 615 is based not only upon the testing data 612 itself, but further upon one or more user parameters 405 (e.g., user wants data analyzed in a particular fashion) and one or more analysis parameters 404 (e.g., algorithms configured to analyze the data in the particularly desired fashion, whether established by the user or otherwise). Execution of the analysis tool 615 in this fashion results in generation of analysis data 620, which may be according to various embodiments transmitted to at least the distribution module 700 for further processing. In certain embodiments, the analysis data 620 may also, like the testing data 612 be transmitted to the data module 400 for storage (whether permanently or otherwise) as result data 406.

Further details with regard to the execution of the execution module 600 will be provided elsewhere herein, but it should be understood that execution of the testing tool 610 corresponds substantially with execution of step 1004 of FIG. 4 and steps 1201-1211 of FIG. 6A. In an analogous fashion, execution of the analysis tool 615 corresponds substantially to execution of step 1004 of FIG. 4 and step 1212 of FIG. 6A, all as will be described in further detail elsewhere herein.

Remaining still further with FIG. 3, the distribution module 700 is generally configured according to various embodiments to execute at least a report tool 710 that provides to one or more users of the system 200 described herein an indication of some sort of the results of the testing and/or analysis performed thereby. In certain embodiments, execution of the report tool 710 requires as input therefor at least a portion of the user parameters 405 (e.g., what type of report, alert, instruction, or the like is desired and/or required) and generation and receipt of (either automatically or upon query therefor) at least some portion of analysis data 620 from the execution module 600.

Execution of the report tool 710 according to various embodiments results in the generation of at least one of: (a) one or more reports 712; (b) one or more alerts 714; and/or (c) one or more instructions 716 (e.g., computer-generated and/or readable commands, or human-readable commands). The type of distribution generated and/or transmitted depends in certain embodiments at least in part upon the one or more user parameters 405 and upon the one or more users to which distribution is expected. In these and still other embodiments, the reports 712 may be textual or graphical-based, or a combination thereof, as may be seen in at least FIGS. 7A-D, as will be described in further detail elsewhere herein. According to various embodiments, the alerts 714 may comprise an indication of the availability of reports and/or instructions; while in other embodiments, the alerts 714 may be configured for one or more of a mere indication of an error condition or a request for authorization of further action to be taken by the system 200. In at least one embodiment, the instructions 716 may be configured to facilitate updating of building component settings and/or characteristics based upon the results of the testing and analysis performed thereon. As a non-limiting example, a particular component setting may be adjusted so as to improve efficiency upon the system 200 reaching a conclusion via analysis and automated testing that existing operating conditions are less than optimal, as detailed elsewhere herein.

Further details with regard to execution of the distribution module 700 will be provided elsewhere herein, but it should be understood that execution of the report tool 710 corresponds substantially with execution of steps 1005-1006 of FIG. 4 and step 1213 of FIG. 6A.

Before departing from FIG. 3, it is also worth highlighting that the various modules 400-700 depicted therein are configured according to various embodiments for communication and/or transmission of data there-between. In certain embodiments, such communication and transmission may be automatic, whereas in other embodiments, one or more modules may be configured to actively query another module as to whether newly received, captured, or generated data exists. In still other embodiments, one or more modules may passively stand-by to await receipt of new or updated data prior to executing any of the tools contained therein, as may be desirable for particular circumstances. In various embodiments, upon receipt of all of the pertinent data necessary for execution of the respective tools contained within the modules 400-700, such modules may be configured to automatically proceed with the execution thereof, whether as a single sequential process or as an iterative/circular process, as will be described in conjunction with FIGS. 5 and 6A. In any of these and still other embodiments, execution of certain of the tools contained within the modules 400-700 may require real-time authorization from one or more users of the system prior to commencing with the execution thereof, again however as may be desirable according to particular circumstances.

Turning now to FIG. 4, such shows an exemplary high-level flowchart 1000 describing an exemplary process for application of the system 200, which may in certain embodiments involve the execution of one or more of the modules 400-700 described previously herein with respect to FIG. 3. For example, steps 1001-1003 of FIG. 4 may be executed by the configuration module 500 (and its associated tools 510, 520) as described with respect to FIG. 3. Such steps 1001-1003 of FIG. 4 also according to various embodiments correspond substantially to the expansion thereof as flowchart 1100 of FIG. 5. Still further, it should be understood that step 1004 of FIG. 4 may be executed by the execution module 600 of FIG. 3 and that steps 1005-1006 of FIG. 4 may be executed by the distribution module 700 of FIG. 3, all of which still further corresponds substantially to the expansion thereof as flowchart 1200 of FIG. 6A. Additional exemplary and non-limiting flowcharts 1300 and 1400 of FIGS. 6B and 6C may also be executed by or via modules 600-700 according to various embodiments.

It should be understood that according to various embodiments, the process illustrated by flowchart 1000 in FIG. 4 can be applied as a single pass application. In other embodiments, however, the system 200 (or the modules, tools, software, and/or applications associated therewith and/or contained therein, as have been previously described) may be configured to loop the sequence at any delay interval including zero. In certain embodiments the delay interval may be user-adjustable at any time; in other embodiments, the delay interval may be pre-established or pre-determined, whether by a user or otherwise.

In step 1001 according to various embodiments, the automated testing system 200 is configured to establish communication with the BAS 100, as may be also referred to as the building "automation system" or more generally as a "control system" based at least in part upon its configuration in which it is designed to control various components and systems of components in a building or other analogous structure. In certain embodiments, step 1001 may be performed by the configuration module 500 as described previously herein. In any of these and still other embodiments, it should be understood that execution of step 1001 is configured to at least in part initiate the automated testing sequence conducted via the system 200 by at least ensuring that an operable communication link (e.g., via a network 130 or otherwise) exists between the system 200 and the BAS 100.

It should be understood, of course, that in certain embodiments wherein the system 200 and the BAS 100 are integrated, the establishment of communication there-between may not be necessary. In other embodiments, even where integration exists, an establishment of communication between automated control system or BAS points may be necessary so as to confirm operation between the system 200 and those sensors and/or other elements associated with the components or systems of components being monitored and tested. It should also be understood that step 1001 may only be performed during an initial testing sequence in certain embodiments, such that while one or more steps illustrated in FIG. 4 may be executed in an iterative fashion, step 1001 may be performed only once. In other embodiments, step 1001 may be performed more than once and/or however as may be desirable for particular circumstances, as previously described herein.

Remaining with FIG. 4, upon completion of step 1001 according to various embodiments, the automated testing system 200 is configured to execute step 1002, wherein all of the automation control or BAS system points are read and documented. It should be understood that in certain embodiments those BAS points that are read correspond only to those with which an operable communication link has been established via step 1001. In other embodiments, via step 1002 an attempt may be to read all standard BAS points, in which case, if one is unable of being read and/or documented, the system may be configured to re-execute step 1001 in an attempt to confirm the presence of a particular BAS point. Of course, any of a variety of configurations may be envisioned, as may be designed to confirm communication and to read/document all control system or BAS points for purposes of initiation of a testing sequence thereof, as commonly known and understood in the art. Further details regarding steps 1001-1002 of FIG. 4 may be understood with reference to step 1101 of FIG. 5, as will be described in further detail below.

Returning to FIG. 4, upon completion of steps 1001 and 1002 according to various embodiments the automated testing system 200 is configured to proceed with step 1003, during which the read/documented control system or BAS points are correlated to automated test variables and tests associated therewith are configured for subsequent execution. Correlation of the control system or BAS points to specific automated test variables comprises in certain embodiments combining of various BAS point data 402 and initiation data 515 (see FIG. 3) so as to verify that all read and/or documented BAS points are configured for accurate and efficient automated testing. Correlation may also in other embodiments further comprise incorporation of one or more test parameters 403 and/or user parameters 405 so as to configure one or more customizable tests for automated execution upon completion of the correlation of components that are the subject thereof. Additional details regarding step 1003 of FIG. 4 may be understood with reference to steps 1102-1109 of FIG. 5, as will be described in turn below.

Remaining momentarily further with FIG. 4, upon completion of the necessary test and BAS or control system point correlation and pre-test configuration of step 1003, the system 200 is configured according to various embodiments to proceed into step 1004, wherein one or more functional, system, and/or performance test(s) may be executed, as such tests have been previously defined elsewhere herein and as may be executed as a non-limiting example via the testing tool 610 (see FIG. 3) of the execution module 600. In certain embodiments, during step 1004 the results and/or collected data of such tests may be further analyzed in step 1004, whether via the analysis tool 615 (see FIG. 3) or otherwise. Analysis should be understand to comprise at least some form of manipulation of the data collected via the test(s) conducted, which may be implemented, much like the tests themselves, via one or more algorithms or the like. With reference again to FIG. 3, in certain embodiments, at least a portion of certain user parameters 405 and analysis parameters 404 may be incorporated for purposes of executing the analysis (e.g., via the analysis tool 615), so as to enable users of the system 200 to in part customize the test(s) conducted, as may be desirable in certain circumstances. It should be understood, of course, that in other embodiments, customization may be limited substantially or otherwise, so as to preserve a sufficient degree of automation via the system 200, as detailed elsewhere herein. In any of these and still other embodiments, additional details regarding the execution of step 1004 (see FIG. 4) thereof may be understood with reference to steps 1201-1212 of FIG. 6A, as will be described in turn below.

Returning again to FIG. 4, upon completion of step 1004, the system 200 is configured according to various embodiments to generate one or more reports (and/or alerts) in step 1005. As described with reference to FIG. 3, such reports 712 and/or alerts 714 may be generated and/or transmitted to one or more users of the system in accordance with one or more user preferences defined thereby (or via default parameters), however as may be desirable. Upon completion of step 1004 and in certain embodiments concurrently with execution of step 1005, the system 200 is configured to further command control system or BAS points to new values based at least in part upon the test results (e.g., testing data 612 of FIG. 3) and/or the analysis results (e.g., analysis data 620 of FIG. 3). Additional details regarding the execution of steps 1005-1006 of FIG. 4 may be understood with reference to step 1213 of FIG. 6A; however generally speaking the command(s) configured to place BAS points to new values should be considered as instructions (see instructions 716 of FIG. 3) that facilitate adjustment of one or more parameters of a component (or system of components) associated with the BAS point(s) so as to improve the functionality and/or efficiency thereof upon completion of the automated test(s) performed via the system 200 described herein. In this manner, operation of the BAS 100 is improved via execution of the automated testing system 200, as detailed previously herein.

Turning now to FIG. 5, such illustrates a flowchart 1100 for the interface and configuration of the system, as may be carried out according to various embodiments by the modules, tools, software, and/or applications of the system 200, as illustrated in at least FIGS. 1-4. As previously noted, the steps illustrated in the flowchart 1100 are summarized in FIG. 4 by elements 1001-1003 therein. According to various embodiments, the processes and logic demonstrated by FIG. 5 are generally executed when the system 200 is interfaced with a BAS 100 for the first time. As a result, because the illustrated processes of FIG. 5 serve as a basis for the system 200 to communicate with any system (e.g., the BAS 100 or otherwise) that it will be testing, such are only executed once initially. Of course, it should be understood that the processes may be periodically updated, for example should a user wish to revise tests to be executed, parameters associated therewith, or the like, however as may be desirable in certain scenarios and embodiments. Similarly, if the system (e.g., the BAS 100 or otherwise) is itself updated or revised, for whatever reason, the process steps illustrated in FIG. 5 may be then executed as well, so as to reconfirm the interface and integration between the system 200 and any system (e.g., the BAS 100 or otherwise) are properly configured.

Via execution of step 1101, the automated testing system 200 according to various embodiments is configured to execute an application (e.g., one or more of the initiation tool 510 and/or the correlation tool 520 of FIG. 3) to facilitate discovery of the control system or BAS points and one or more characteristics or operational properties associated therewith. Upon discovery thereof, the BAS point object and the point properties thereof are stored in at least one database (e.g., in the data module 400 of FIG. 3), thereby recording and documenting within the system 200 the components upon which the automated testing will be conducted along with one or more characteristics thereof.

Returning to FIG. 4, upon completion of step 1101, the system 200 is configured according to various embodiments (e.g., via the configuration module 500) to proceed to step 1102. During step 1102 an application or tool (e.g., the correlation tool 520 of FIG. 3) is configured according to various embodiments to organize and categorize control system or BAS points by controller network path and/or equipment type. In this manner, it should be understood that the BAS points are correlated, as least in part, for purposes of the subsequent test configuration and execution, as will be described further below with continued reference to FIG. 5 and also to FIG. 6A. One non-limiting example of such correlation is that of the Pressure Independent VAV Test where the airflow set point, or CFM setpoint, of the testing program needs to be correlated to a corresponding point within the BAS. In order for the test to function properly, the test variable of the airflow set point must be linked to the correct value within the BAS to ensure the commands are being sent to the proper location. Based on nomenclature, point object properties and the like, the correlation software will determine according to various embodiments the point that best correlates to airflow set point and link that point to the correct variable within the testing program. Other correlations of this nature and otherwise may be envisioned, as should likewise be considered within the scope and spirit of the present disclosure.

Upon completion of step 1102 the system 200 is configured according to various embodiments to proceed to step 1103, during which verification is performed to ascertain whether the physical system of the BAS 100 is correctly represented as a result of the performed correlation of the BAS points via the system 200. If one or more discrepancies are identified, the system 200 according to various embodiments proceeds to step 1104, during which the control or BAS point arrangement (i.e., correlation) is adjusted to more accurately reflect and represent the actual physical system layout in, for example, a hierarchical format. In certain embodiments, the system 200 may facilitate user manual adjustment of the control or BAS point arrangement; in other embodiments, the system 200 may be configured to troubleshoot the correlation in an automated fashion instead of or in addition to any manual adjustment thereof. In any of these and still other embodiments, once the physical system is represented correctly (as determined in step 1103) various embodiments of the system 200 are configured to proceed to step 1105. It should be understood that execution of steps 1103-1105 in this manner may involve an iterative process that may, in certain instances, be performed more than once prior to procession to step 1105.

With reference again to FIG. 5, during step 1105 according to various embodiments, the organized control point hierarchy (and/or any characteristics or data associated therewith) is actively stored within one or more databases, as may be associated with and/or accessible via the data module 400 of the system 200. It should be understood that storage of data within the database 1110 of FIG. 5 is the equivalent of storage within one or more databases associated with and/or accessible via the data module 400; indeed, the database 1110 should be considered a non-limiting example thereof. It should further be noted that upon completion of any of steps 1105 and 1101, at least a portion of any data or results collected and/or generated therein may be automatically and/or periodically transmitted to the database 1110 for storage and saving therein. Such data may subsequently, in part or in whole, be provided and/or otherwise retrieved for subsequently executed steps, such as the non-limiting example of retrieval of a portion of data for execution of step 1106, as will be discussed, in turn, below.

Remaining with FIG. 5, execution of step 1106 according to various embodiments comprises selection of one or more test(s) for execution. In certain embodiments, one or more test configurations, as may be pre-determined or pre-established, may be selected automatically via the system 200. In other embodiments, at least some portion of the tests and/or test configurations may be user selectable. In at least one of these embodiments, the user selection(s) may be made manually, as prompted and/or facilitated via the system 200. In other embodiments, so as to preserve the automated nature of the system 200 described herein, the user selection may be performed via cross-reference of the test(s) and/or test configurations (see also test parameters 403 of FIG. 3) against user parameters 405 as may have been pre-established and/or otherwise pre-determined by one or more users of the system and stored within one or more databases associated with the data module 400 or otherwise (e.g., in database 1110).

According to various embodiments, in step 1106, where the system 200 is configured for storage and retrieval of pre-established user selection(s), identified selection(s) by the system based therein may be subject to further confirmation by the user via application or modular interface assistance. In other words, in certain embodiments, even where pre-established criteria or user preferences have been stored, the system 200 may be configured to request confirmation of the selected tests and/or test configurations from the user prior to the actual execution thereof. In certain embodiments, such confirmation parameters may be stored as a further portion of the one or more user parameters, as illustrated in FIG. 3 and described previously herein.

According to various embodiments, upon execution of step 1106, the system 200 is configured according to various embodiments to proceed to step 1107, which analogously to step 1103 performs an internal system inquiry as to whether the selected test(s) are truly configured correctly, as may be defined by one or more test parameters 403 (see FIG. 3). Remaining with FIG. 5, it should be understood that if one or more discrepancies are identified within or related to the test(s) and/or their configuration, the system 200 is configured according to various embodiments to proceed to step 1108, during which adjustment thereof may occur. Adjustment in step 1108 may be configured substantially the same as described previously herein with respect to step 1104, whether automatically, via manual user adjustment, and/or a combination thereof, however as may be desirable.

Upon execution of step 1108, the system 200 is configured according to various embodiments to proceed via a static loop back to step 1107, which process may be executed in an iterative fashion until sufficiently few (or no) further discrepancies are identified and the system 200 reads the test(s) as configured correctly. Thereupon, in certain embodiments, the system 200 executes step 1109, which provides an indication that the test(s) are configured appropriately and ready for execution. With reference momentarily to FIG. 3, the completion of step 1109 should be understood to correspond substantially with the passage of data from the configuration module 500 to the execution module 600. Steps performed by the execution module 600 upon completion of step 1109 of FIG. 5 are described, in turn, below, with reference to at least FIG. 6A, and by analogy to FIGS. 6B-6C.

Turning now to FIG. 6A, such illustrates an exemplary activity diagram 1200 detailing a generic Variable-Air-Volume (VAV) Functional & Performance Test (VAV Test) that may be conducted by the system 200 according to various embodiments. The VAV test is described as "generic" in the sense that it represents a simple exemplary and non-limiting test that demonstrates the interaction between the automation system 200 and the BAS 100 so as to describe the fundamental steps and processes common to all exemplary functional and performance tests in sufficient detail so as to enable those of ordinary skill in the art to practice the inventive concepts pursued herein.

Beginning with step 1201, the system 200 according to various embodiments, upon activation of the execution module 600 (see FIG. 3) is configured to determine first the network address for a computer hosting the application and set it to be used as an interface argument for the duration of the execution of the test. As noted in the upper left-hand corner of FIG. 6A, the duration of the test may vary, depending upon how many iterative loops are performed and still further upon whether such loops are performed for a single device or across multiple devices, the latter as may be involved with performance-focused testing. Where the entire process of FIG. 6A is iteratively looped across multiple devices, it should be further understood that according to various embodiments an iterative sub-loop (see lower left-hand quadrant of FIG. 6A) may be further executed for each device (e.g., each VAV terminal device controller) within the broader multiple device test configuration. In this manner, testing may be automated across not only each device, but also multiple devices, such that upon completion of the automated testing facilitated via the system 200 described herein, such devices may be commanded or instructed to new settings or values so as to improve or otherwise enhance the efficiency, performance, and/or functionality thereof, as may be desired or otherwise required for future operations.

Returning to FIG. 6A, it may thus be understood that upon execution of step 1202, in which all of the devices (e.g., VAV controllers) to be tests are read/retrieved from the database 1214 (which should be understood as analogous to database 1110 and to be accessible or otherwise maintained via the data module 400 described elsewhere herein), the system 200 may be configured to proceed into the sub-loop process governed by steps 1203-1211, each as will be described in turn, below.

Beginning with step 1203, the system 200 according to various embodiments is configured to read in all device parameters (e.g., points, such as control system points or BAS points). During step 1204, pre-test calculations are performed to determine a number of airflow increments for, as a non-limiting example, a VAV terminal device. Where alternative devices are tested, it should be understood that alternative pre-test calculations may be performed so as to capture one or more pertinent parameters and/or characteristics of the tested device. As illustrated in FIG. 6A, in certain embodiments during step 1204 a maximum value may be also calculated or otherwise determined, which in at least the context of the VAV terminal device may correspond to a maximum airflow test value. Additional and/or alternative maximum values and/or incremental values may be also determined, as may be understood further with reference to iterative steps 1207-1209, as a non-limiting example.

Before addressing steps 1207-1209, with reference again to FIG. 6A, it may be seen that following execution of step 1204, the system is configured according to various embodiments to proceed to step 1205 of the test execution, in which logging of each control system or BAS point is initiated. In certain embodiments, logging occurs at 30 second intervals; in other embodiments, it should be understood that logging may occur at any of a number of frequencies or periodic timeframes, as may be desirable for particular scenarios and/or as implemented based upon one or more user-imposed parameters and/or preferences.

In step 1206 according to various embodiments, the system 200 initiates the iterative test sequence, with command of the airflow set-point (in the non-limiting example of a VAV terminal device) to zero. Steps 1207-1209 iteratively adjust the airflow set-point to a next-desired value (e.g., 1), then the next-desired value (e.g., 2), continuing to a final desired value (e.g., N). In certain embodiments, it should be understood that the values need not be sequential (e.g., 0, 1, 2, 3, 4, 6, etc.); instead, such may be incremental (e.g., 0, 5, 10, 15, 20, 25, etc.) or otherwise (e.g., exponential, as in 0, 1, 2, 4, 16, 256, 65,536, etc.). Any of a variety of incremental or otherwise defined values may be envisioned, provided such are configured to demonstrate operation of the tested device over a range of characteristics that substantially cover an operational spectrum for the device. In this manner, functionality and/or performance of the device (or performance of multiple devices across a system thereof) may be tested and evaluated via the system 200. In certain embodiments, differing types of devices may be included within the system, with a VAV terminal device controller, such as that illustrated in FIG. 6A being but one non-limiting example thereof.

Returning with focus upon the steps of FIG. 6, upon completion of step 1209, which may follow after any number of iterations between the same and step 1206 (depending at least in part upon the number of values between 0 and N for which testing is desired), the system 200 is configured according to various embodiments to proceed to step 1210, during which the system 200 releases all BAS points back to BAS control. In other words, the building automation system (BAS) returns to normal operation conditions as it is released from a "test mode" during which control is held by the system 200 described herein. Control via the system 200 may, in certain embodiments, commence upon execution of the configuration module and the initiation steps performed thereby (see FIG. 3-4), as previously described herein.

In conjunction with step 1210, although illustrated in FIG. 6A as sequential thereto, the system 200 according to various embodiments is configured in step 1211 to stop logging BAS point data and to store all captured test data and/or logs associated therewith to one or more databases 1214 (or database 1110 or any of one or more databases associated with and accessible via the data module 400, as previously described herein) Upon completion of step 1211, testing is considered complete according to various embodiments—at least with respect to the exemplary VAV terminal device controller and testing proceeds to step 1212, which may be understood with reference to FIG. 3 as the transmission and/or transfer of execution from the testing tool 610 to the analysis tool 615, the latter of which is configured to perform one more data analyses and/or manipulations upon the test data 612 captured (and stored in step 1211).

In step 1212 specifically, the system 200 according to various embodiments is configured, for each device (e.g., for each VAV terminal device controller) to execute one or more post-processing analysis algorithms so as to assess the testing data obtained and stored via the automated testing procedures described previously herein. Such post-processing analysis in certain embodiments results in generated analysis data 620, as may be stored in one or more databases 1214 (e.g., accessible via the data module 400 (see also FIG. 3). The one or more algorithms may be based at least in part upon one or more pre-established analyses parameters, as may have been determined and imposed by one or more users or otherwise stored within the system, as a default setting and the like.

Remaining with FIG. 6A, upon completion of post-processing analysis algorithm execution in step 1212, the system 200 is configured according to various embodiments to, in step 1213 generate one or more reports for each device. The reports 712 (see FIG. 3) may be transmitted via email, made available via a webpage, or stored locally or remotely, however as may be desirable and/or based at least in part upon one or more user preferences or parameters 405 (see FIG. 3). In certain embodiments, along with reports, execution of step 1213 may additionally and/or alternatively generate one or more alerts 714 and/or instructions 716 (see FIG. 3). As a non-limiting example, such instructions 716 may comprise one or more commands (computer-readable or otherwise) to set BAS points to new values based at least in part upon the test and analysis results, so as to improve overall operation of the device and/or a system in which the device resides. Exemplary reports 712 may be seen in FIGS. 7A-7D and FIG. 8, as will be described elsewhere herein.

Figure 6B:
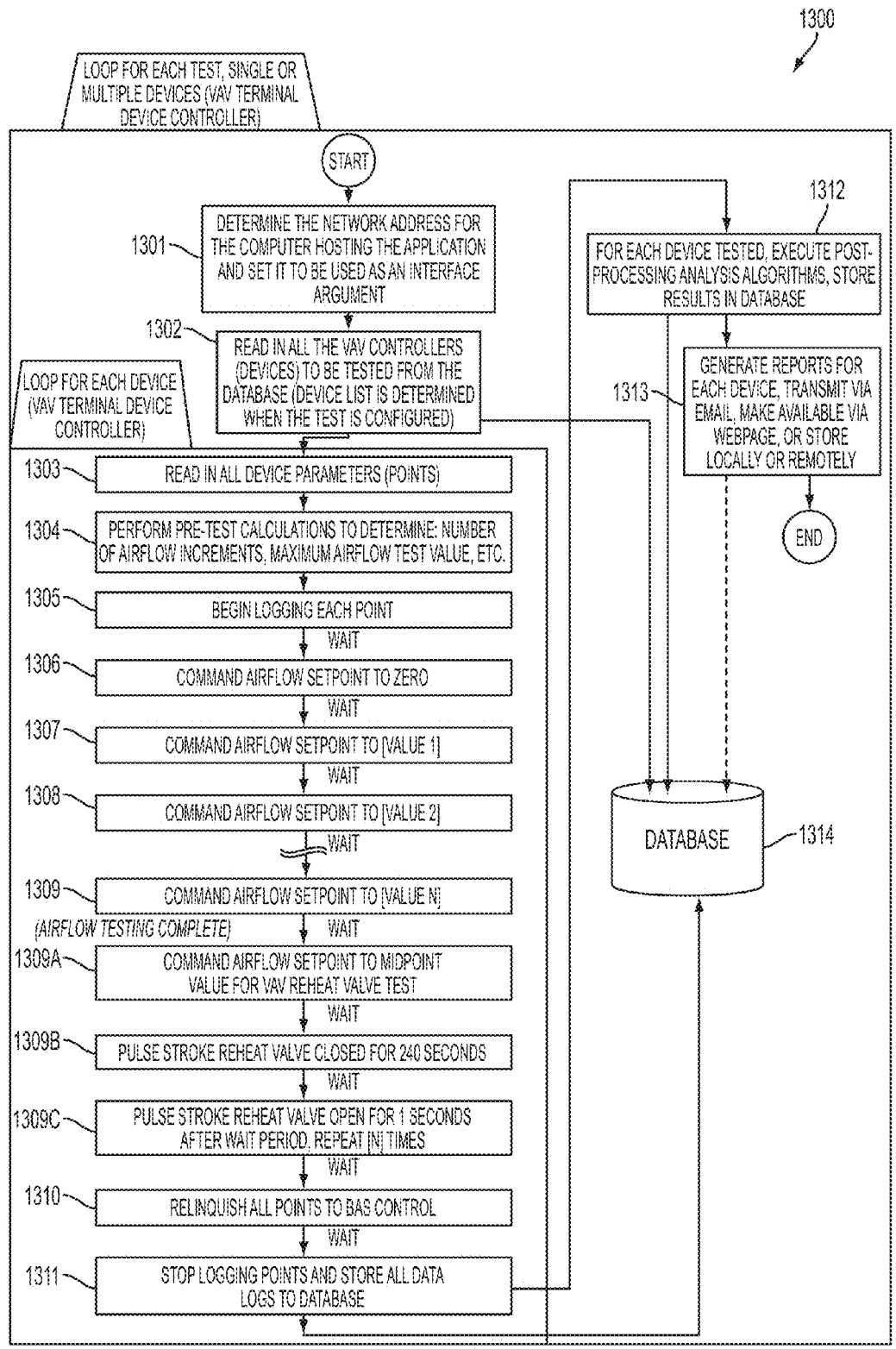
FIG. 6B is another exemplary activity diagram 1300 illustrating an exemplary Variable-Air-Volume (VAV) Functional and Performance Test (VAV Test) incorporating a reheat valve test according to various embodiments of the present invention.

Turning now to FIG. 6B, such illustrates an exemplary activity diagram 1300 detailing an exemplary VAV Test that incorporates a specific exemplary test for the reheat valve thereof, as may be conducted by the system 200 according to various embodiments. Generally speaking, it should be understood that all of the steps (1301-1313) and elements (1314) illustrated thereon but for steps 1309A-1309C operate and/or are performed substantially the same as described previously herein for steps 1201-1213 and database element 1214 of FIG. 6A, in the context of a generic VAV Test. In this manner, it should be understood further that now further illustrated steps 1309A-1309C illustrate the particular details of the reheat valve test as may be further incorporated within the exemplary VAV test according to various embodiments.

With reference now to step 1309A-1309C specifically, according to various embodiments, upon completion of the airflow testing and a subsequent waiting period (e.g., 5 minutes, as illustrated in FIG. 6A, although any of a variety of incremental wait period values may be envisioned and should be considered within the scope and spirit of the present invention as described herein), the execution module 600 (see FIG. 3) may be configured to further command the airflow set point to a midpoint value for purposes of VAV reheat valve testing procedures. Upon setting thereof in step 1309A, the module is configured to proceed to step 1309B, wherein the reheat valve is pulsed or stroked closed for 240 seconds, which duration should also be considered exemplary and non-limiting in nature. During step 1309C, the valve is further pulsed or stroked open for one second and after a wait period, such step may be repeated any desirable number of times.

As in the context of FIG. 6A, it should also be understood that the duration of the test of FIG. 6B may also vary, depending upon how many iterative loops are performed and still further upon whether such loops are performed for a single device or across multiple devices, the latter as may be involved with performance-focused testing. Where the entire process of FIG. 6B is iteratively looped across multiple devices, it should be further understood that according to various embodiments an iterative sub-loop (see lower left-hand quadrant of FIG. 6B) may be further executed for each device (e.g., each VAV terminal device controller and/or each reheat valve contained therein) within the broader multiple device test configuration. In this manner, testing may be automated across not only each device, but also multiple devices, such that upon completion of the automated testing facilitated via the system 200 described herein, such devices may be commanded or instructed to new settings or values so as to improve or otherwise enhance the efficiency, performance, and/or functionality thereof, as may be desired or otherwise required for future operations.

Figure 6C:
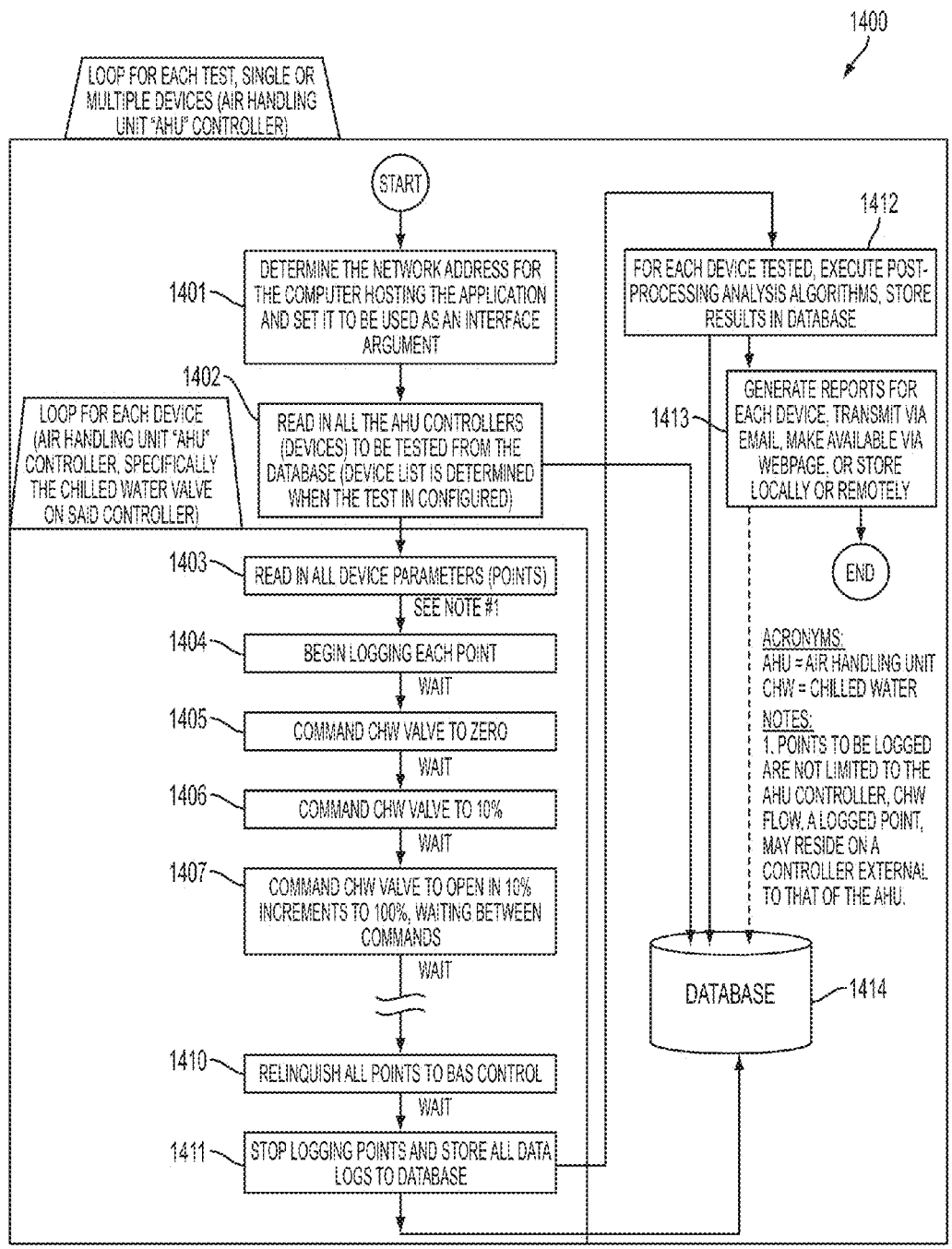
FIG. 6C is another exemplary activity diagram 1400 illustrating an exemplary non-VAV Test for evaluating an Air Handling Unit (AHU) Controller, particularly the chilled water valve (CHW valve) thereof according to various embodiments of the present invention.
Figure 7A:
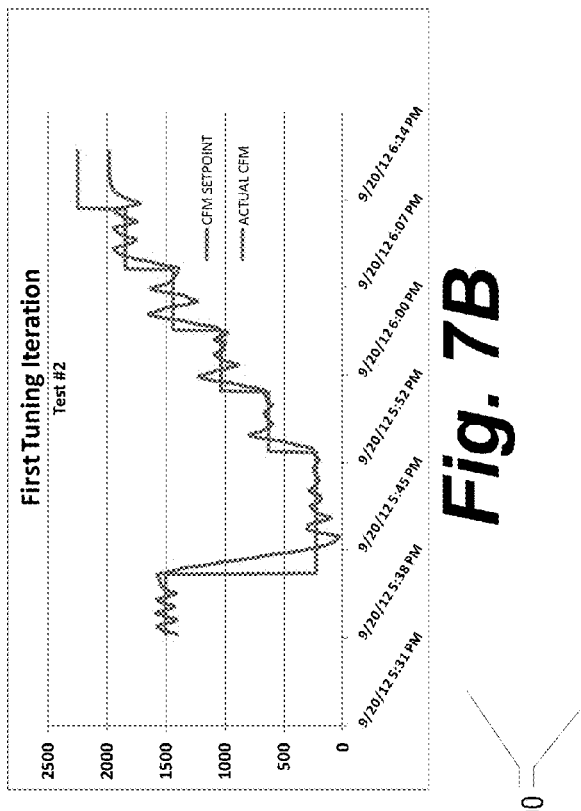
Figure 7B:
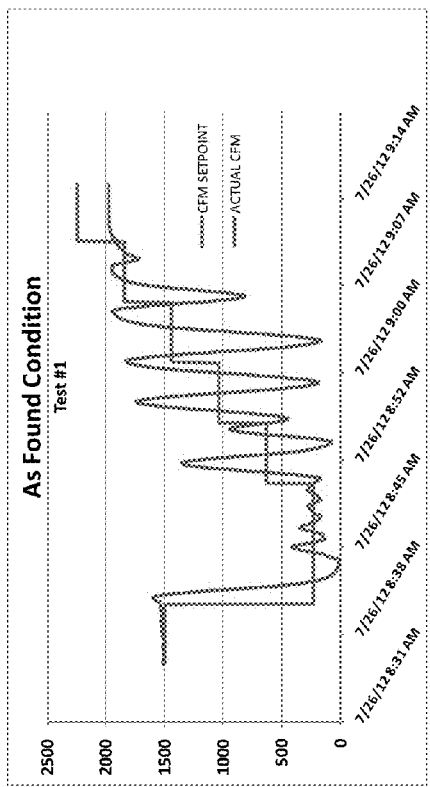
Figure 7C:
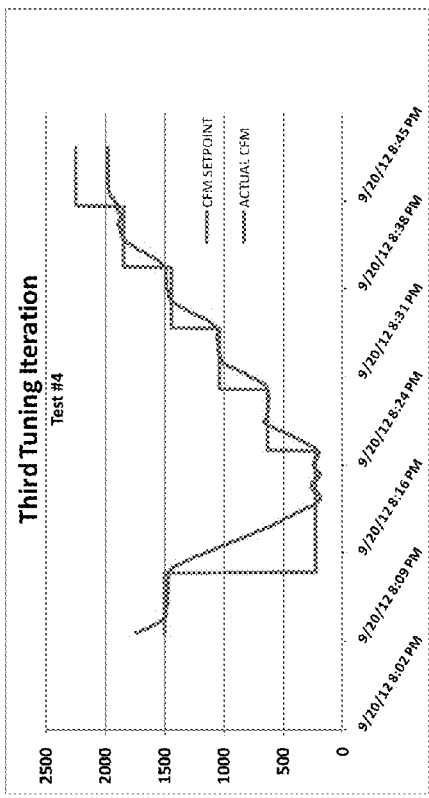
Figure 7D:
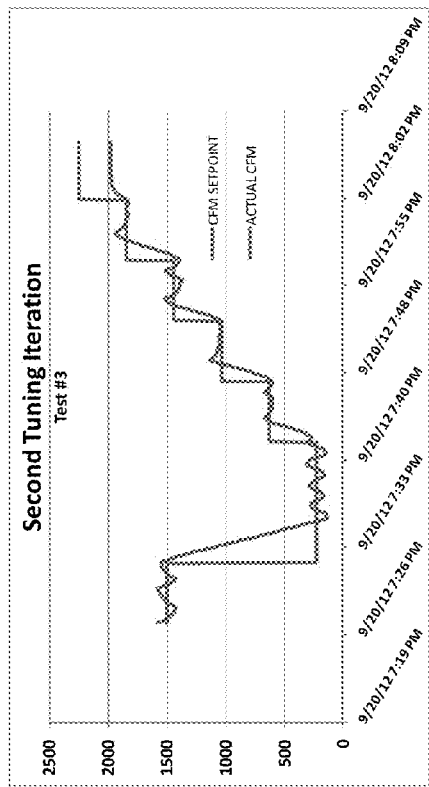

Turning now to FIG. 6C, such illustrates an exemplary activity diagram 1400 detailing an exemplary non-VAV Test that is directed instead toward testing of an air handling unit (AHU) controller and/or specifically a chilled water valve (CHW valve) thereof, as may be conducted by the system 200 according to various embodiments. Generally speaking, it should be understood that all of the steps (1401-1404, 1410-1413) and elements (1414) illustrated in FIG. 6C but for steps 1405-1407 operate and/or are performed substantially the same as described previously herein for steps 1201-1213 and database element 1214 of FIG. 6A, in the context of a generic VAV Test. Of course, where appropriate, such steps are performed here with respect to the AHU controller and/or the CHW valve—instead of with respect to a VAV terminal device controller. In this manner, it should be understood further that now further illustrated steps 1405-1407 illustrate the particular details of an exemplary CHW valve test according to various embodiments.

With reference now to step 1405-1407 specifically, according to various embodiments, upon commencement of logging of each point associated therewith at 30 second intervals (or another desirable interval as may be provided in certain embodiments) in step 1404, the execution module 600 (see FIG. 3) may be configured to next (after a wait period or otherwise, as such has been described previously herein with respect to both FIGS. 6A and 6B) command the CHW valve to a zero value, which value may in at least one embodiment correspond to a closure of the valve. In step 1406 after a further wait period in certain embodiments, the CHW valve may be commanded to a 10% value, corresponding in at least one embodiment to a 10% open valve setting. As step 1407 conveys, the valve may be subsequently opened in sequential 10% increments, with or without intermediate wait periods, as may be desirable. Thus, settings may be 10%, 20%, 30% and the like, until the value is 100%, which in certain embodiments may correspond to a fully open valve setting. Following such procedures, the module 600 may be configured to proceed to step 1410, which relinquishes all points back to BAS control in a fashion analogous to that previously described herein with respect to FIGS. 6A and 6B, but here with respect to the chilled water valve and not a VAV component.

In FIG. 6C, as in the context of FIGS. 6A-B, it should also be understood that the duration of the test of FIG. 6C may also vary, depending upon how many iterative loops are performed and still further upon whether such loops are performed for a single device or across multiple devices, the latter as may be involved with performance-focused testing. Where the entire process of FIG. 6C is iteratively looped across multiple devices, it should be further understood that according to various embodiments an iterative sub-loop (see lower left-hand quadrant of FIG. 6C) may be further executed for each device (e.g., each AHU controller and/or each chilled water valve contained therein) within the broader multiple device test configuration. In this manner, testing may be automated across not only each device, but also multiple devices, such that upon completion of the automated testing facilitated via the system 200 described herein, such devices may be commanded or instructed to new settings or values so as to improve or otherwise enhance the efficiency, performance, and/or functionality thereof, as may be desired or otherwise required for future operations.

With reference now to FIGS. 7A-D, such illustrate a series of reports 712 as may be generated via the automated test and analysis processes executed by the system 200 described herein. For example, in FIG. 6A, execution of step 1213 resulted in generation of at least one or more such reports, upon completion of iterative tests upon a VAV terminal device controller. With this context, it may be understood that the sequential charts of FIGS. 7A-7D represent charts that may be generated via the system 200 (e.g., via distribution module 700 as previously detailed herein) so as to graphically convey to one or more users of the system the results obtained via first, second, and third tuning iterations following observation of an "as found" condition (e.g., a zero set value condition, as detailed in FIG. 6A). As may be seen from considering the sequence of illustrates in FIGS. 7A-7D, the iterative tunings of the device under testing therein results in the "actual CFM" plot of actual recorded and/or otherwise collected data progressively move so as to closer and more fully match the CFM set-point value as would be anticipated. In this manner, the actual functionality and/or performance of a device may be improved such that it better mirrors anticipated or otherwise optimally-desired characteristics.

While FIGS. 7A-7D illustrate an exemplary chart as a type of report 712, it should be understood that any of a variety of reports may be generated via execution of the system 200 described herein. Another non-limiting type of report may be seen in FIG. 8, which illustrates a performance map for an air cooled chilled water generating unit (chiller). In the report illustrated by FIG. 8, power demand (kW) to the chiller and corresponding chiller load (tons of cooling) is collected over the full operating range of the chiller with respect to the energy the chiller extracts from the cooling media (or load) and the corresponding outdoor air temperature. After data is collected at each outdoor air temperature bin over the full spectrum of the load range of the chiller, the data is processed into values of kW/ton, or operating efficiency, and the array fields are populated. In the example of FIG. 8, the magnitude of the value within each array field is used to shade the field with a corresponding color for ease of user interpretation.

The report 800 of FIG. 8 should be considered non-limiting in that the field shading does not occur in every instance, and the report may be generated with data comprising less than the full operating range of the chiller. This type of performance map can be created for any type of test or data in multiple embodiments that illustrate performance criteria over more than one operating condition for any type of equipment and is not limiting to representing energy consumption or efficiency. Indeed, any of a variety of mapping, reporting, and/or charting configurations may be envisioned, as such are commonly known and understood in the art for the conveyance of data to one or more users of a system.

Turning now to FIGS. 9A-B, according to various embodiments, all data exchanged with the BAS throughout the course of any test sequence will be further assigned a data quality value, which value may be stored along with all other data, including data intervals, from each test. An exemplary and non-limiting purpose and/or advantage of maintaining this data is to provide quality metrics that convey a confidence level of the data collected for purposes of reporting the same and/or for facilitating adjustments to one or more BAS values or set points. Individual data "tagging" for quality purposes may, in certain embodiments, take the form of flags that correlate to the specific error observed, where flags may be organized by their relative effect on the confidence level of the data. As a non-limiting example, if data is missing then such data may be associated with a flag entitled "Flag-0", indicating both a zero confidence level as well as a 0% data quality. At the other end of the spectrum, as another non-limiting example, an interval that may be good but exceeds some limit (whether user-defined or otherwise) may be flagged with a flag entitled "Flag-90" indicating a high, but not 100% confidence level and a data quality of 90%.

According to various embodiments, the data quality metric generated may be based on several factors, including the anticipated values of the data, the capabilities of the system, the stagnation of the data, validity parameters, missing data, and the like. For example, if a BAS point is configured to be constrained between two values and the data exceeds these limits, the data is suspected to be erroneous and will be flagged. As another non-limiting example, if the physical system is understood to be capable of performing between certain limits and the data exceeds these limits, the data will be flagged. As yet another non-limiting example, if the data stagnates to a great precision (i.e. 34.9876 CFM is repeatedly read), the data will be flagged. In these and other embodiments, if parameters associated with the data such as associated BACNet object properties indicate the data is not valid, the data will be flagged. For example, the BACNet object properties may indicate the last time the data was updated was 15 minutes ago during a one minute polling trend, the data is stale, but that doesn't mean the data is not collected. Still further, according to various embodiments, if data is missing, those intervals, although null, are flagged.

According to various embodiments, with continued reference to FIGS. 9A-B for context, whenever flagged data is used in analysis, the worst data quality used in the calculations may be assigned to the result. As a non-limiting example, if you average ten consecutive intervals and the lowest data quality across them all is one of 50%, the resulting data in its entirety is assigned a data quality value of 50%. In these and other embodiments, when a visual report or chart 900 such as that in FIG. 9A is generated, any data with a quality of <100% (or less than another desirable threshold or value) may be visually identified in such a way so as to identify it as deserving closer scrutiny. For example, a chart may have blue, green, and orange chart lines, wherein any segment of any line with <100% data quality being plotted in a magenta color. In other embodiments, portions of chart lines 910 with data quality <100% (or another threshold or value or otherwise) may be identified for closer scrutiny.

Tabular reports may also be provided (see table 920 of FIG. 9B), wherein the date and/or time of an observed value may be annotated with one or more flags 922 (e.g., Flag-40) to indicate a 40% confidence in data quality. In at least the illustrated embodiment, one or more flags 926 may be also provided (e.g., Flag-100) so as to indicate a 100% data quality. Subsequent or other observed data may only indicate values without further indication of one or more flags, for example where 100% data quality exists, as may be desirable for particular applications.

According to various embodiments, with continued reference to FIG. 9B, it should also be understood that the term "flag" is used to convey the manner in which certain items may be highlighted or otherwise emphasized for users of the system, for example, where less than a 100% data quality confidence exists. In certain embodiments, the term "flag" may be replaced with the term "data quality" or "DQ" or "confidence value" or "CV" or the like, however as may be desirable for particular applications. Still further, it should be understood that according to various embodiments, while in the illustrated embodiment a "flag" is applied for all data quality values, in some instances a flag (or comparable annotation) may only appear if quality is less than 100% (or still further if quality is less than a pre-determined threshold or value range—e.g., if quality is less than 80% or if it is outside of a range from 80-100%, or the like), all however as may be desirable for particular applications.

As may be seen, observed actual values (e.g., 199 CFM, 12 CFM, 206 CFM, and the like) may also be displayed in this tabular form, so as to provide to users an indication of an actual operational value associated with the 40% (or other) confidence value in the data quality. In this regard, it should be understood that any of a variety of tabular (or otherwise formatted) reports may be envisioned for purposes of communication data quality (or other information) to one or more users of the system without departing from the scope and spirit of the present invention.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed herein. Indeed, modifications and other embodiments are intended to be included within the scope of the present invention. Additional details in this regard, related to those embodiments described herein and to still other embodiments may be further gleaned from the attached Appendix. In addition, although specific terms are employed herein, they are used in a generic and descriptive sense only and not for purposes of limitation.

The invention claimed is:

1. An automated testing system for physically controlling, operating, testing, and diagnosing an operational functionality and/or performance of one or more building controlled systems, said system comprising:

one or more memory storage areas containing one or more user-defined parameters, one or more analysis parameters, and one or more control system point properties, said one or more control system point properties being associated with one or more properties or characteristics of one or more physical devices connected to the control system for purposes of physically controlling and monitoring thereof, the one or more properties or characteristics including at least a physical limit or a set-point that influences physical operation of the control system; and one or more computer processors configured to:
prior to correlating said one or more control system points with one or more test variables, execute an application configured to automatically discover said one or more control system points, said discovery being via and to confirm at least one communication link between said system and said control system;
correlate said one or more control system points with said one or more test variables, said one or more test variables being associated with one or more test sequences accessible via said system, said correlation involving at least one of organizing or categorizing said one or more control system points by an equipment type, a physical location, and at least one of a controller identity or a network path;

execute at least one of said one or more test sequences based at least in part upon said correlation and at least in part upon one or more of said user-defined parameters, said execution generating test data indicative of one or more results of said at least one executed test sequence;

upon completion of said at least one executed test sequence, at least in part analyze said test data to identify whether one or more discrepancies exist therein, said one or more discrepancies being identified based at least in part upon a comparison of said test data with said one or more control system point properties; and in response to identifying one or more discrepancies, automatically generate one or more executable instructions configured to automatically adjust one or more of said one or more properties or characteristics of the one or more devices connected to the control system, said adjustment being configured to improve the operational functionality and/or performance of one or more building control systems.

2. The system of claim 1, wherein the one or more computer processors are further configured to generate at least one of one or more reports, one or more alerts, or one or more instructions based at least in part upon said test data and upon whether one or more discrepancies were identified as existing therein.

3. The system of claim 1, wherein said one or more devices comprise at least one Variable-Air-Volume (VAV) device.

4. The system of claim 3, wherein said one or more test sequences comprise at least one Variable-Air-Volume (VAV) Functional and Performance Test (VAV Test).

5. The system of claim 1, wherein said system and said control system points are configured to communicate via one or more networks.

6. The system of claim 1, wherein said one or more computer processors are further configured, prior to said execution step, to verify an accuracy of said correlation, said accuracy verification being based at least in part upon a comparison of correlation data to one or more configuration parameters associated with said one or more control system points.

7. The system of claim 6, wherein a successful verification corresponds to the comparison identifying no discrepancies between the correlation data and the one or more configuration parameters.

8. The system of claim 6, wherein, upon an unsuccessful verification based at least in part upon identification of at least one discrepancy between the correlation data and the one or more configuration parameters, said one or more computer processors are further configured, prior to said execution step, to re-correlate said one or more control system points with said one or more test variables.

9. The system of claim 6, wherein, upon an unsuccessful verification based at least in part upon identification of at least one discrepancy between the correlation data and the one or more configuration parameters, said one or more computer processors are further configured, prior to said execution step, to facilitate a manual adjustment of the correlation.

10. The system of claim 1, wherein the one or more user-defined parameters are pre-established prior to said correlation step.

11. The system of claim 1, wherein:
said one or more memory storage areas further contain test configuration data; and
said one or more computer processors are further configured to verify an accuracy of an actual test configuration prior to execution of said at least one test sequence, said accuracy being based at least in part upon a comparison of said actual test configuration to at least a portion of said test configuration data.

12. The system of claim 1, wherein said at least one executed test sequence comprises at least one of a functional test configured to evaluate a functionality status of said one or more devices, a system test configured to evaluate a system status of a system containing a plurality of said one or more devices, or a performance test configured to evaluate a performance status of said one or more devices either in a stand-alone fashion or across said system.

13. The system of claim 1, wherein said at least one executed test sequence comprises a test performed across a plurality of said one or more devices, said test comprising iterative steps that are each performed multiple times so as to evaluate one or more characteristics of said one or more devices.

14. The system of claim 13, wherein:
said one or more computer processors generate said one or more instructions; and
said one or more instructions are configured to command said adjustment of said one or more control system point properties, so as to improve the operational functionality and/or performance of said one or more building control systems.

15. The system of claim 14, wherein said one or more instructions are computer-readable code and said one or more computer processors are further configured to transmit said one of more instructions to said control system for automatic execution thereof.

16. The system of claim 1, wherein said one or more computer processors are further configured to calculate a data quality value associated with the generated test data.

17. The system of claim 16, wherein said one or more computer processors are further configured to generate at least one report containing data therein indicative of said data quality value being less than a defined parameter or threshold value.

18. The system of claim 17, wherein said at least one report comprises a color-coded chart configured such that a single pre-defined color corresponds to at least a portion of the generated test data having a data quality value less than said defined parameter or threshold value.

19. A computer-implemented method for physically controlling, operating, testing, and diagnosing an operational functionality and/or performance of one or more building controlled systems, said method comprising the steps of:

receiving and storing within one or more memory storage areas at least one or more user-defined parameters, one or more analysis parameters, and one or more control system point properties, said one or more control system point properties being associated with one or more properties or characteristics of one or more devices connected to the control system for purposes of physically controlling and monitoring thereof, the one or more properties or characteristics including at least a physical limit or a set-point that influences physical operation of the control system;

prior to correlating said one or more control system points with one or more test variables, executing, via at least one computer processor, an application configured for automatically discovering, said one or more control system points, said discovery being via and to confirm at least one communication link between said system and said control system;

correlating, via said at least one computer processor, said one or more control system points with said one or more test variables, said one or more test variables being associated with one or more test sequences accessible via said system, said correlation involving at least one of organizing or categorizing said one or more control system points by an equipment type, a physical location, and at least one of a controller identity or a network path;

executing, via said at least one computer processor, at least one of said one or more test sequences based at least in part upon said correlation and at least in part upon one or more of said user-defined parameters, said execution generating test data indicative of one or more results of said at least one executed test sequence;

upon completion of said at least one executed test sequence, at least partially analyzing, via said at least one computer processor, said test data to identify one or more discrepancies therein, said one or more discrepancies being identified based at least in part upon a comparison of said test data with said one or more control system point properties; and in response to identifying one or more discrepancies, automatically generating, via said at least one computer processor, one or more executable instructions configured to automatically adjust one or more of said one or more properties or characteristics of the one or more devices connected to the control system, said adjustment being configured to improve the operational functionality and/or performance of one or more building control systems.

20. The computer-implemented method of claim 19, further comprising the step of generating, via said at least one computer processor, at least one of one or more reports, one or more alerts, or one or more instructions based at least in part upon said test data and upon whether one or more discrepancies were identified as existing therein.

21. The computer-implemented method of claim 19, further comprising the step of, prior to said execution step, verifying, via said at least one computer processor, an accuracy of said correlation, said accuracy verification being based at least in part upon a comparison of correlation data to one or more configuration parameters associated with said one or more control system points.

22. The computer-implemented method of claim 19, further comprising the step of, upon an unsuccessful verification based at least in part upon identification of at least one discrepancy between the correlation data and the one or more configuration parameters, prior to said execution step, re-correlating said one or more control system points with said one or more test variables.

23. The computer-implemented method of claim 19, further comprising the step of, prior to execution of said at least one test sequence, verifying, via said one or more computer processors, an accuracy of an actual test configuration prior to execution of said at least one test sequence, said accuracy being based at least in part upon a comparison of said actual test configuration to at least a portion of expected test configuration data.

24. The computer-implemented method of claim 19, wherein said one or more instructions comprise computer-readable code and said method further comprises the step of transmitting said one or more instructions, via said at least one computer processor and across at least one network, to at least said one or more building control system for execution thereof so as to improve the operational functionality and/or performance of said one or more building control systems.

25. The computer-implemented method of claim 19, further comprising the steps of:
calculating, via said one or more computer processors, at least one data quality value associated with the generated test data; and
in response to identifying at least one discrepancy between said at least one data quality value and a parameter associated therewith, generating, via said one or more computer processors, at least one report containing thereon color-coded data indicative of said data quality value being less than said parameter.

26. A computer program product comprising at least one non-transitory computer-readable storage medium having computer-readable program code portions embodied therein, the computer-readable program code portions comprising at least one executable portion configured for:
receiving and storing within one or more memory storage areas one or more user-defined parameters, one or more analysis parameters, and one or more control system point properties, said one or more control system point properties being associated with one or more properties or characteristics of one or more devices connected to the control system for purposes of physically controlling, operating, testing, and monitoring thereof, the one or more properties or characteristics including at least a physical limit or a set-point that influences physical operation of the control system;

prior to correlating said one or more control system points with one or more test variables, executing an application configured for automatically discovering said one or more control system points, said discovery being via and to confirm at least one communication link between said system and said control system;

correlating said one or more control system points with said one or more test variables, said one or more test variables being associated with one or more test sequences accessible via said system, said correlation involving at least one of organizing or categorizing said one or more control system points by an equipment type, a physical location, and at least one of a controller identity or a network path;

executing at least one of said one or more test sequences based at least in part upon said correlation and at least in part upon one or more of said user-defined parameters, said execution generating test data indicative of one or more results of said at least one executed test sequence;

upon completion of said at least one executed test sequence, at least in part analyzing said test data to identify one or more discrepancies therein, said one or more discrepancies being identified based at least in part upon a comparison of said test data with said one or more control system point properties; and in response to identifying one or more discrepancies, automatically generating one or more executable instructions configured to automatically adjust one or more of said one or more properties or characteristics of the one or more devices connected to the control system, said adjustment being configured to improve the operational functionality and/or performance of one or more building control systems.

* * * * *